US011974368B1

(12) United States Patent
Rotolante et al.

(10) Patent No.: US 11,974,368 B1
(45) Date of Patent: Apr. 30, 2024

(54) LIGHT CONTROL SYSTEMS, METHODS, DEVICES, AND USES THEREOF

(71) Applicant: Lumitec, LLC, Delray Beach, FL (US)

(72) Inventors: Steven Marc Rotolante, Jupiter, FL (US); John Alexander Kujawa, Delray Beach, FL (US); Paul Stephan Abbott, Lake Worth, FL (US); Christopher Robert Fulmer, Jupiter, FL (US)

(73) Assignee: Lumitec, LLC, Delray Beach, FL (US)

( * ) Notice: Subject to any disclaimer, the term of this patent is extended or adjusted under 35 U.S.C. 154(b) by 340 days.

(21) Appl. No.: 17/060,251

(22) Filed: Oct. 1, 2020

Related U.S. Application Data

(60) Provisional application No. 62/908,633, filed on Oct. 1, 2019.

(51) Int. Cl.
*H05B 45/325* (2020.01)
*F21S 4/22* (2016.01)
*F21V 23/00* (2015.01)
*H05B 45/20* (2020.01)
*F21Y 115/10* (2016.01)

(52) U.S. Cl.
CPC ................ *H05B 45/20* (2020.01); *F21S 4/22* (2016.01); *F21V 23/001* (2013.01); *H05B 45/325* (2020.01); *F21Y 2115/10* (2016.08)

(58) Field of Classification Search
CPC ........ H05B 45/10; H05B 45/20; H05B 45/30; H05B 45/325; H05B 47/10; F21S 4/22; F21V 23/001; F21Y 2115/10
See application file for complete search history.

(56) References Cited

U.S. PATENT DOCUMENTS

2013/0147359 A1* 6/2013 Chobot .................. H05B 45/20 315/122

FOREIGN PATENT DOCUMENTS

CN 207584447 U * 7/2018

* cited by examiner

*Primary Examiner* — Jimmy T Vu
(74) *Attorney, Agent, or Firm* — Calfee, Halter & Griswold LLP

(57) ABSTRACT

Disclosed is a strip lighting system that receives lighting control signals digitally over a conductor which also provides power to the strip lighting system. The strip lighting system includes a controller which receives the control signals operates switches which cause current to flow through one or more light emitting diodes and also a non-lighting load to permit the strip lighting system to have a constant load characteristic to a lighting system controller controlling the strip lighting system.

23 Claims, 38 Drawing Sheets

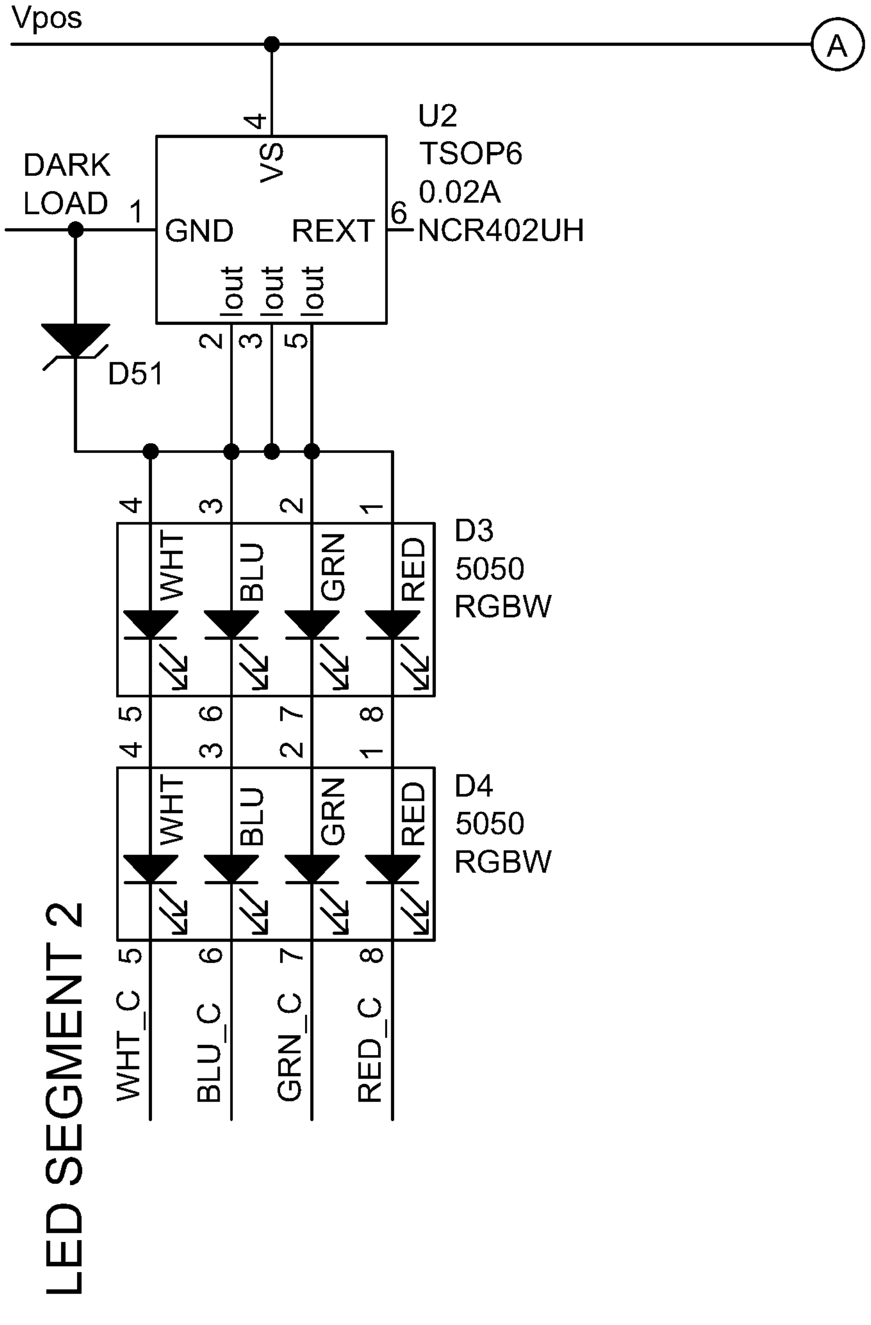
FIG. 10A.I

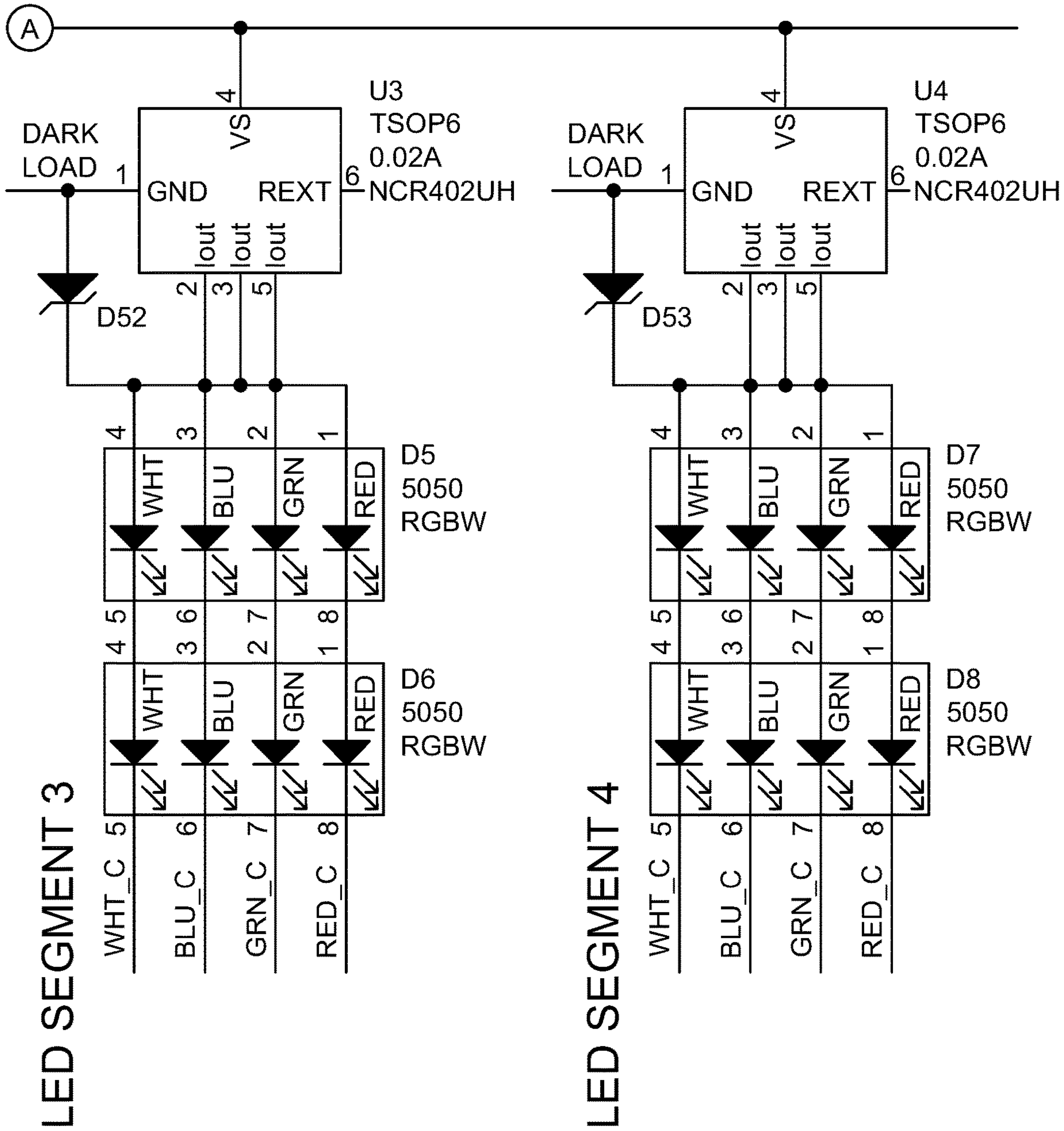
FIG. 10A.II

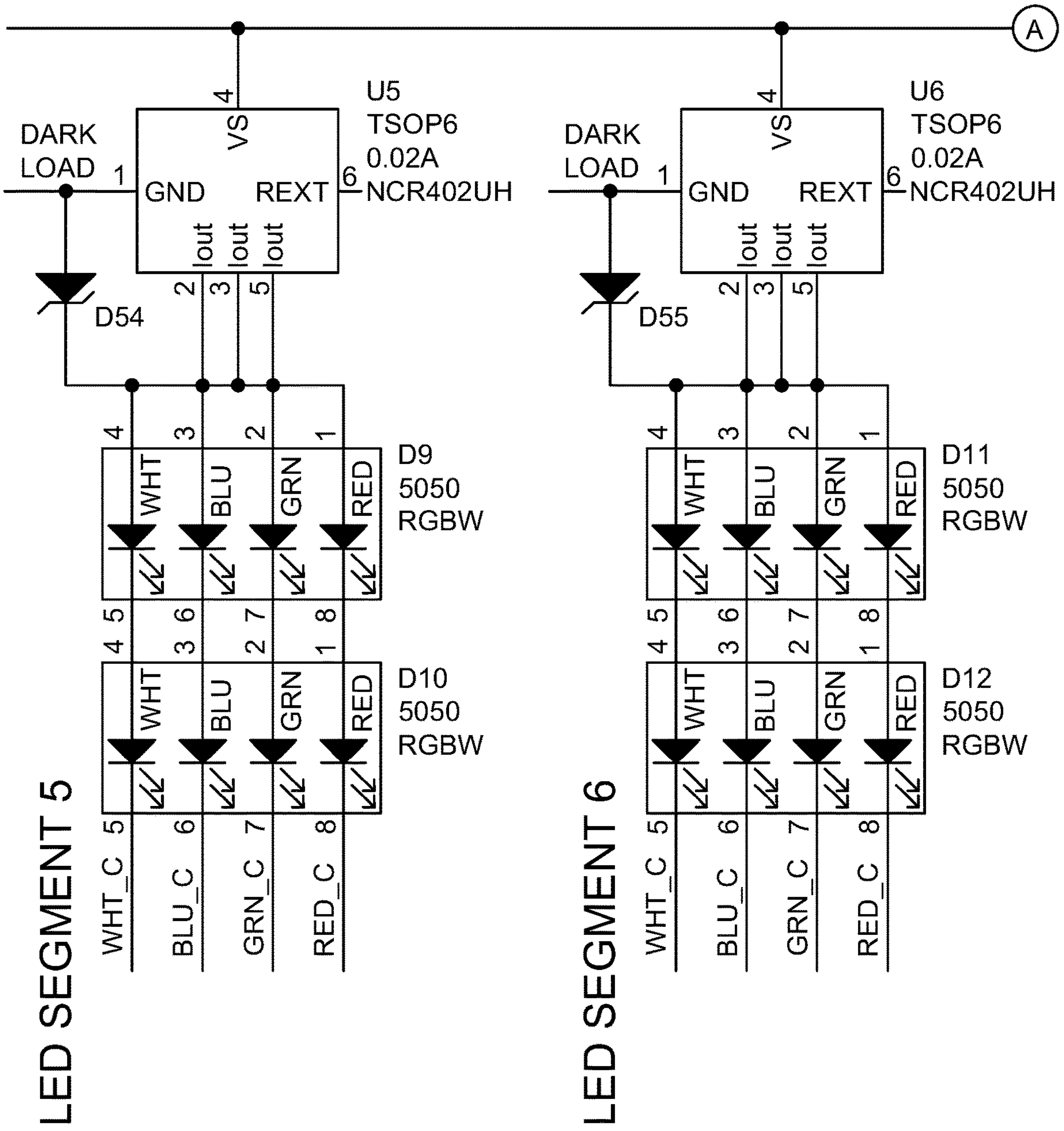
FIG. 10B.I

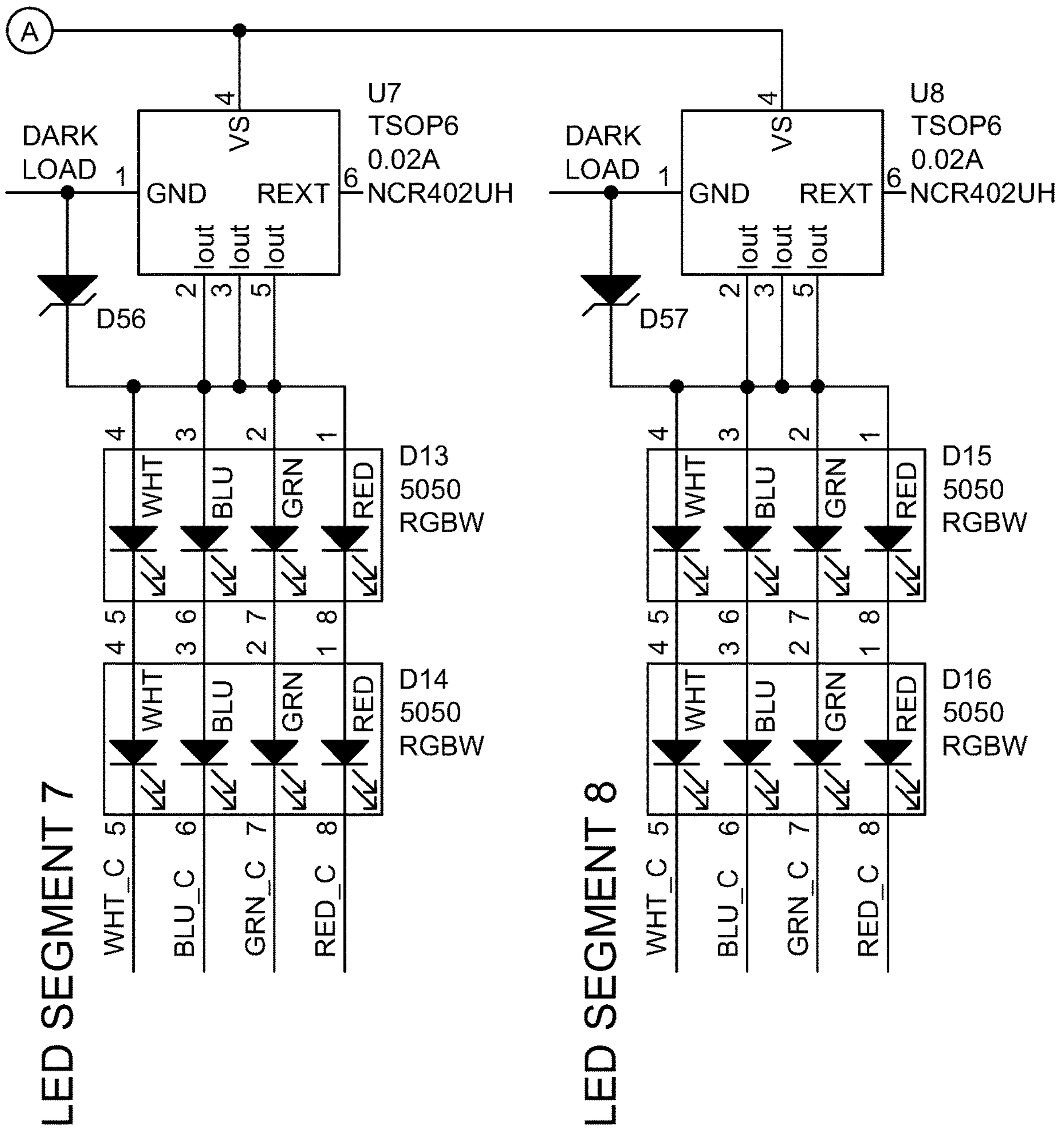
FIG. 10B.II

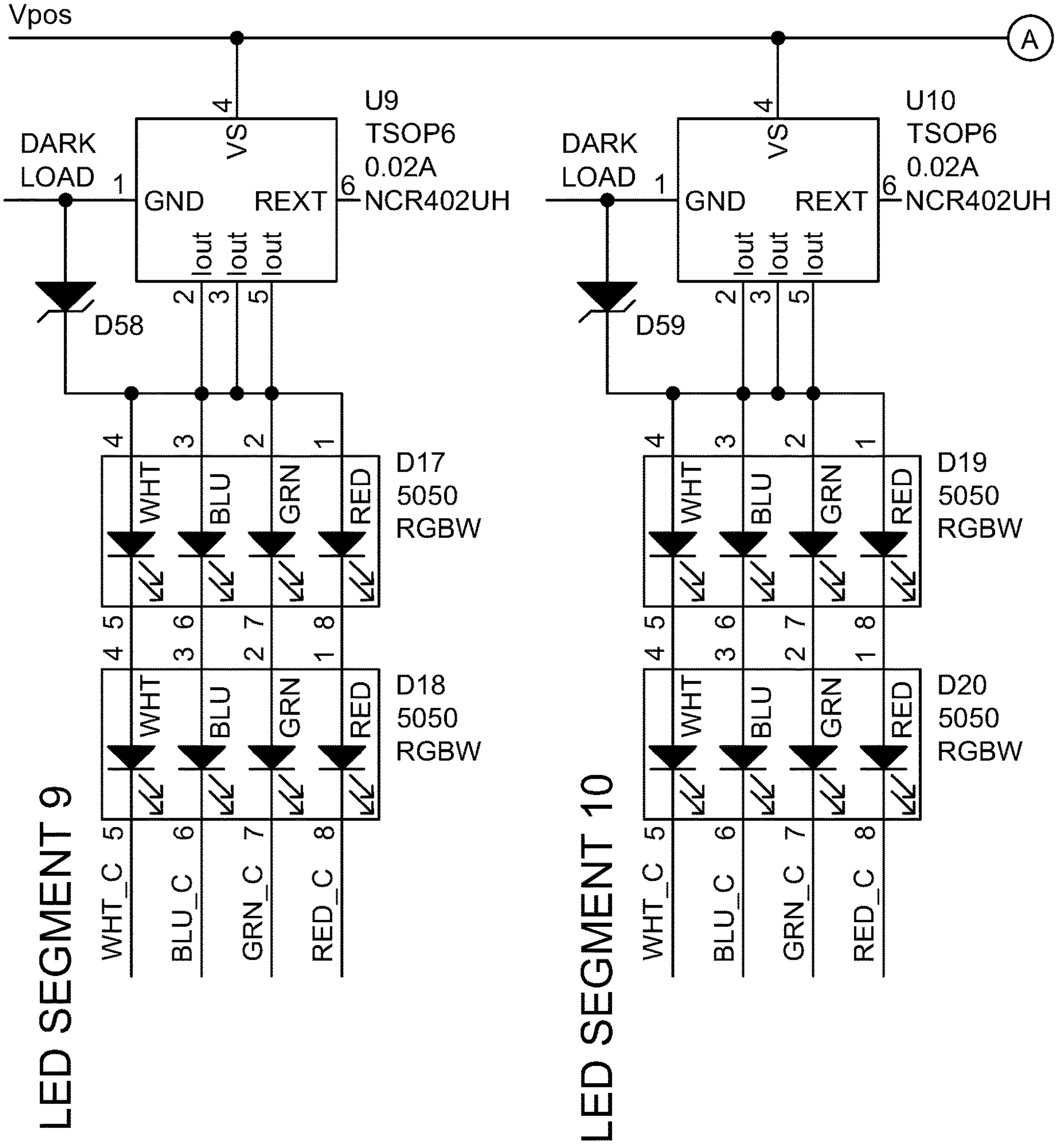
FIG. 10C.I

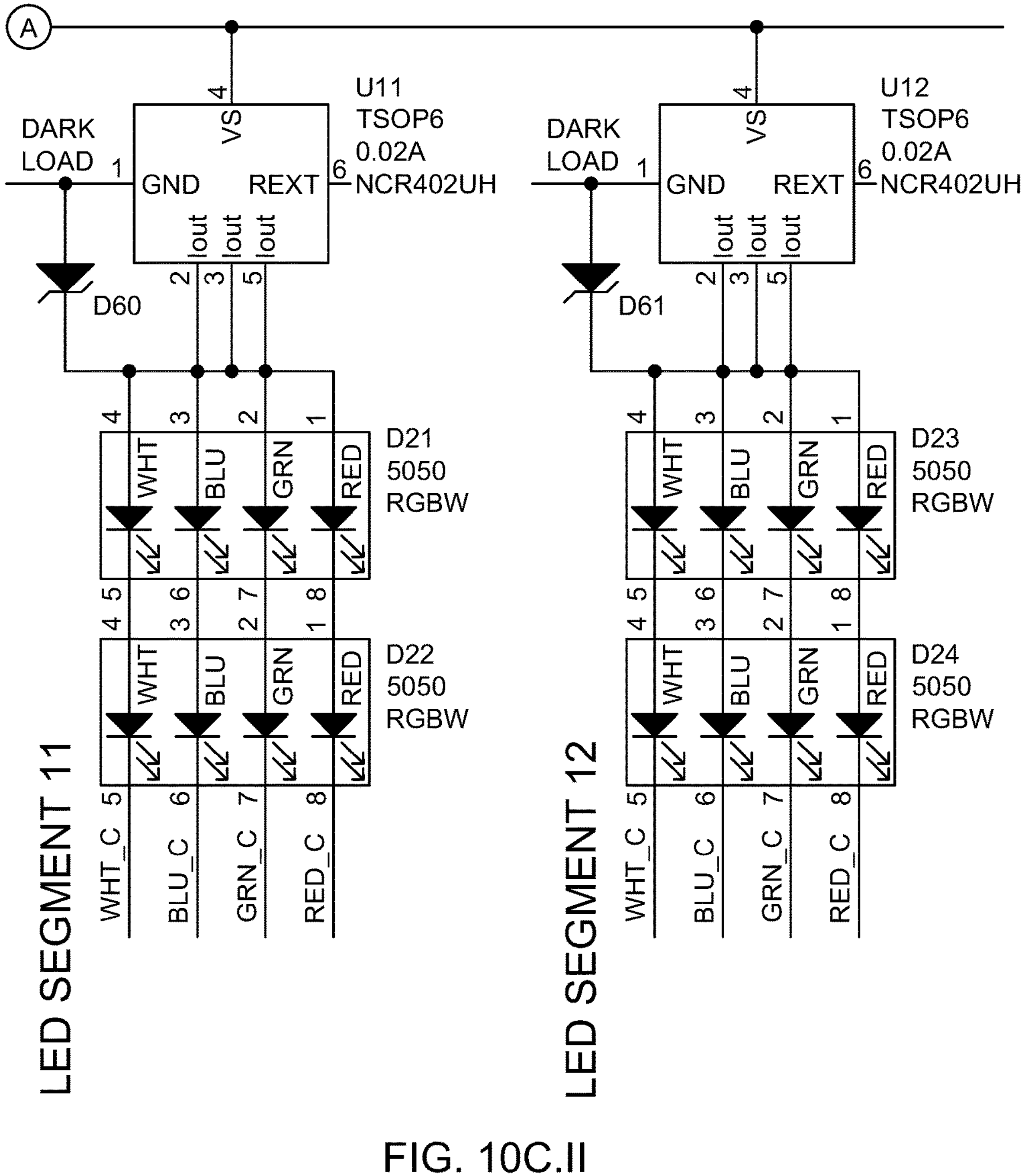
FIG. 10C.II

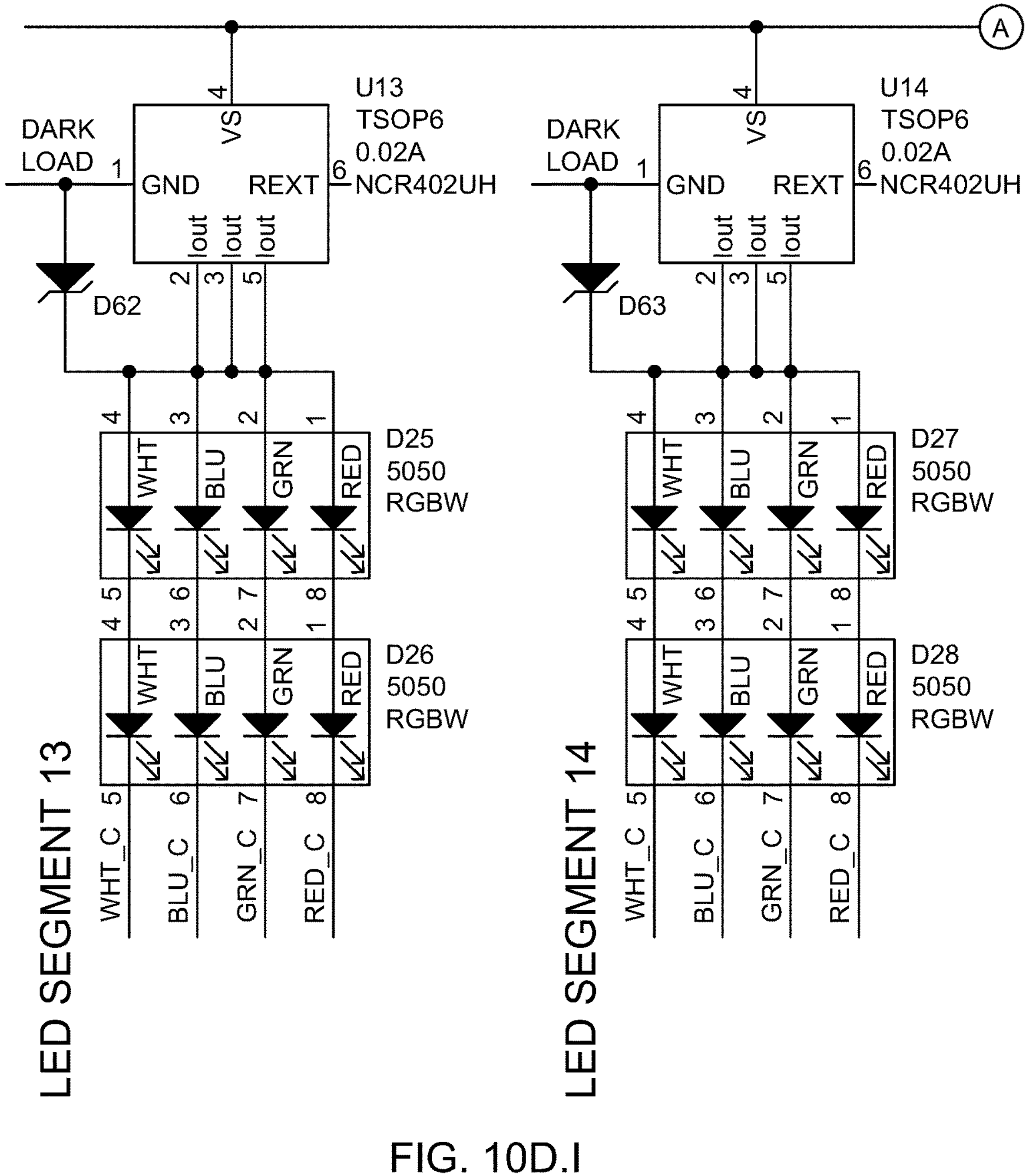
FIG. 10D.I

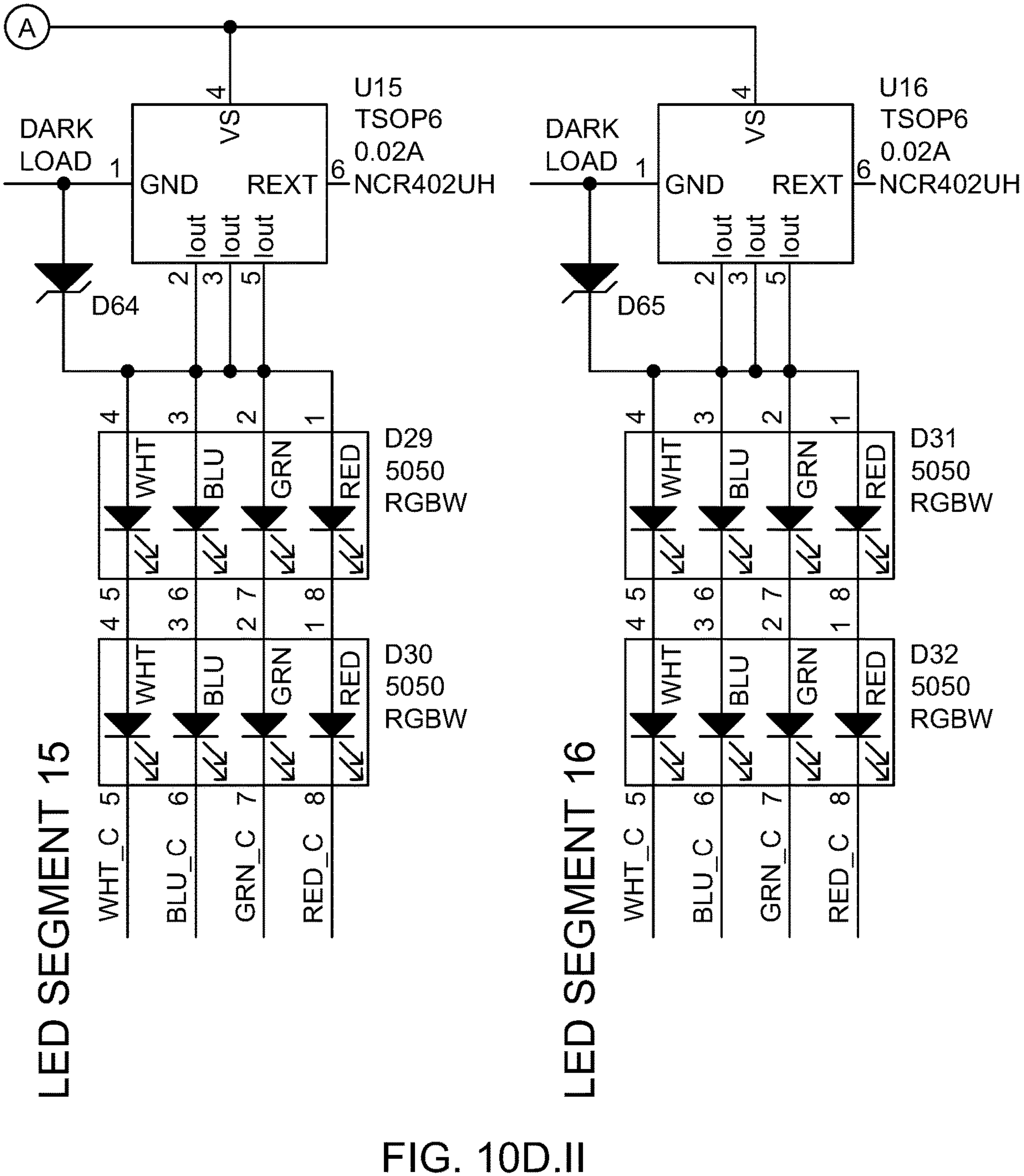
FIG. 10D.II

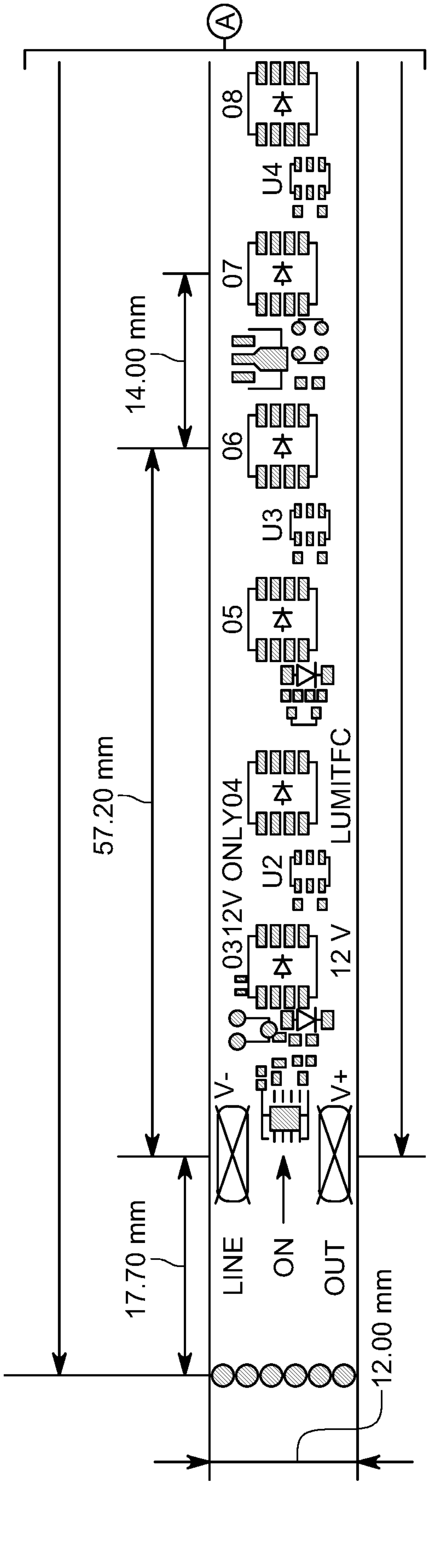
FIG. 11A.I

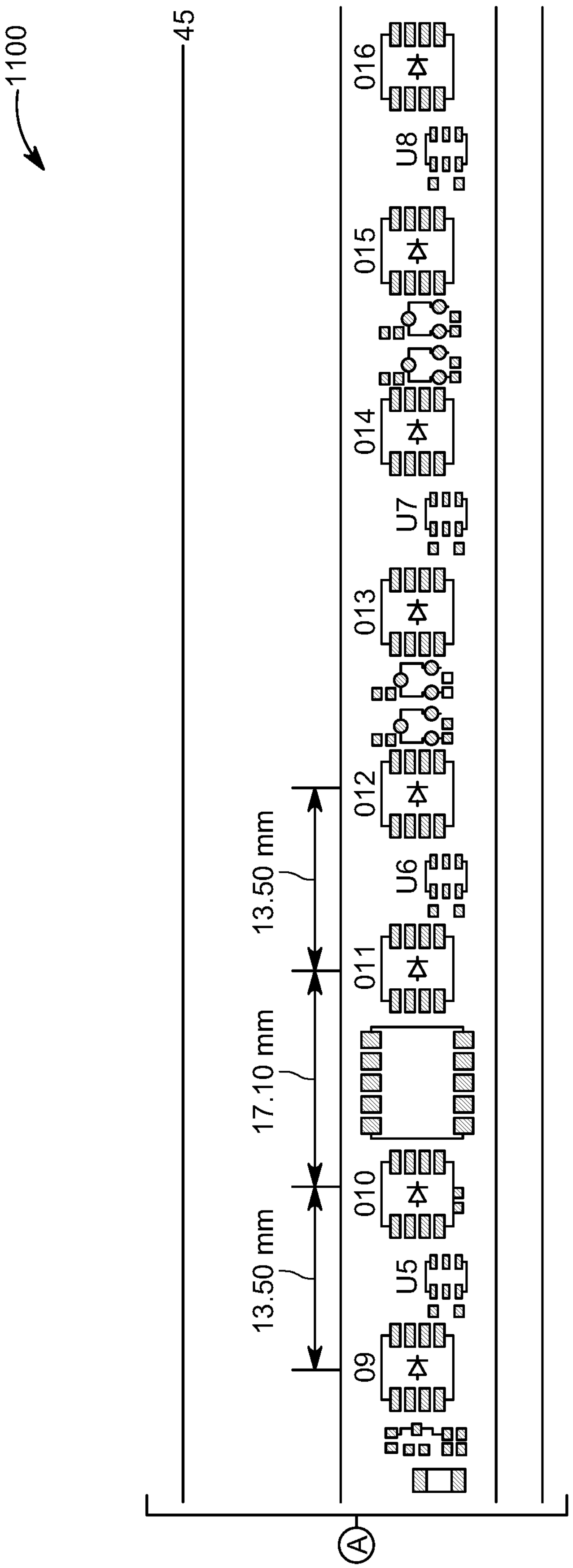
FIG. 11A.II

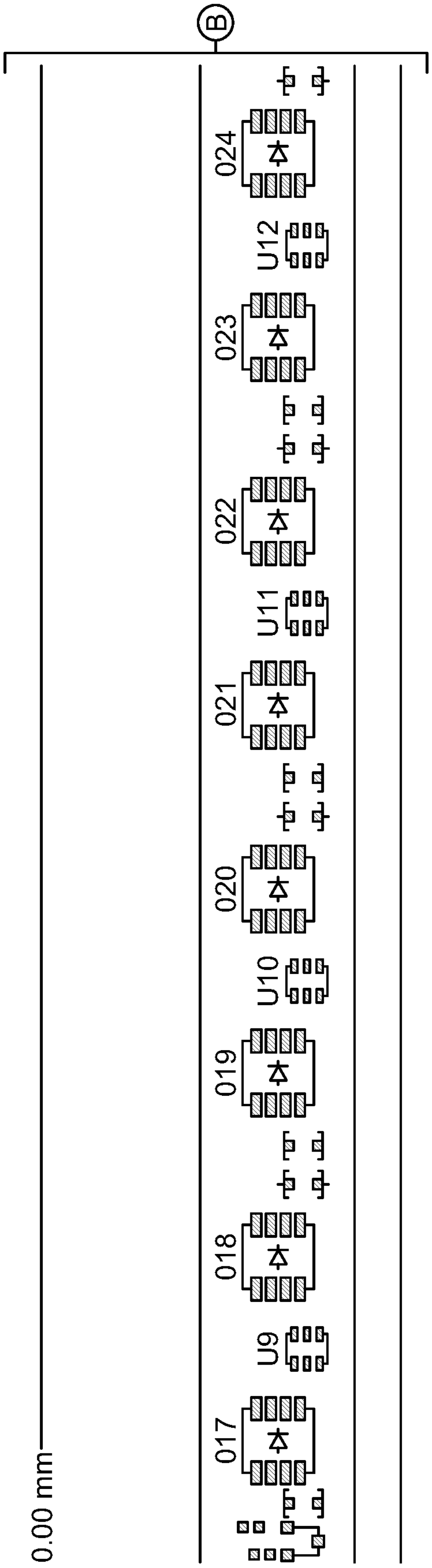
FIG. 11B.I

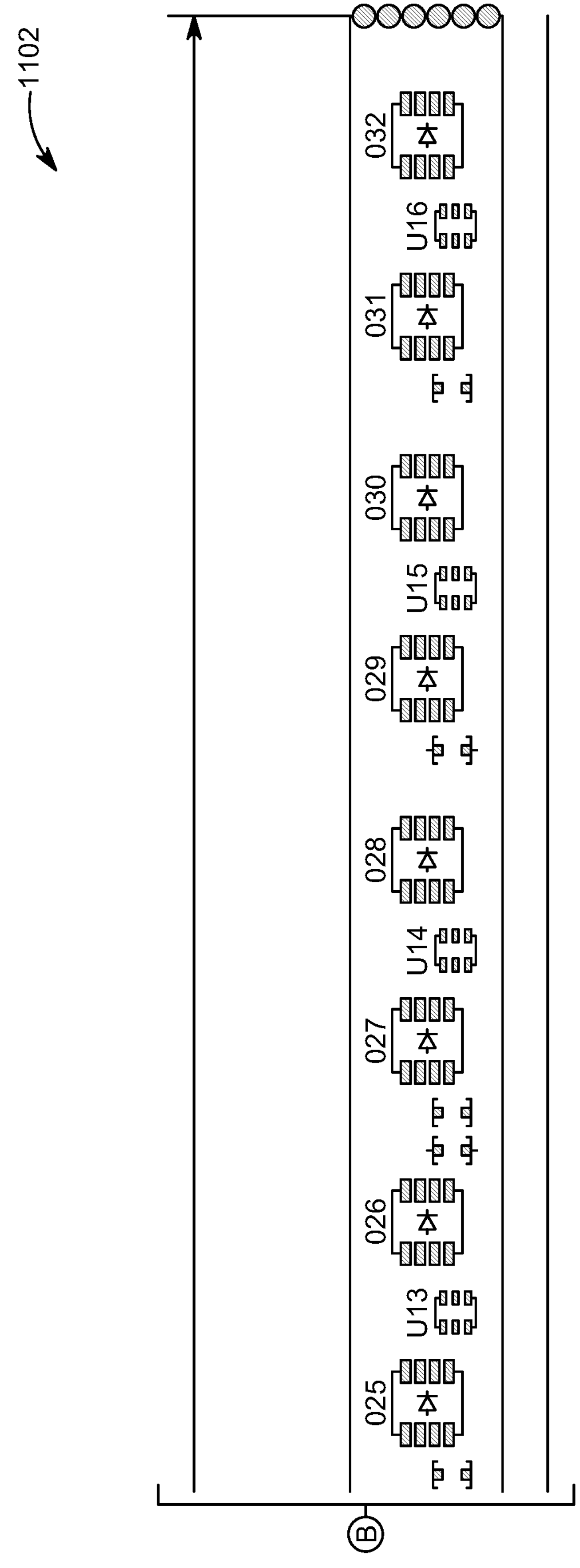
FIG. 11B.II

LIGHT CONTROL SYSTEMS, METHODS, DEVICES, AND USES THEREOF

CROSS-REFERENCE TO RELATED APPLICATIONS

This application claims priority to and the benefit of U.S. Provisional Patent Application Serial No. 62/908,633, entitled "LIGHT CONTROL SYSTEMS, METHODS, DEVICES, AND USES THEREOF" and filed Oct. 1, 2019 ("the '633 Application"), the entire disclosure of which is incorporated herein by reference as though fully recited herein.

This application is related to prior filed utility application U.S. application Ser. No. 16/575,922, and two design patent applications, U.S. application Ser. No. 29/706,294 (entitled HOUSING) and U.S. application Ser. No. 29/706,296 (entitled DISPLAY SCREEN WITH ICON), all filed on Sep. 19, 2019, the entire disclosures of all of which are fully incorporated herein by reference.

TECHNICAL FIELD

This disclosure generally relates to controllable lights (also called luminaires herein) for use with light control systems, methods, devices, and uses thereof.

BACKGROUND

Lighting devices can be offered in a variety of shapes, sizes, and configurations. Overall, lighting devices are utilized for illumination, projection, aesthetics, and the like. As such, lighting devices have many different types of applications. In some examples, lighting devices can be configured with one or more light emitting diodes (LEDs). High luminosity, bright colors, variety in light source combinations, and low power consumption are features of and reasons for the popularity of LEDs. In general, the color changes and combinations are achieved by passing electric currents and pulses through various LEDs, e.g., red plus blue-shifted yellow or three basic colors of red, blue and green to generate multifarious light sources unsurpassed by other light sources or lighting devices. Moreover, through various combinations of colors and changes in luminosity, a dynamic lighting effect can be achieved. LEDs are typically driven with either analog signals or Pulse Width Modulated (PWM) signals.

SUMMARY

In an exemplary embodiment, a flexible linear strip luminaire that contains a microcontroller that is not integrated into the LED package and that receives data signals and controls the luminaire where the luminaire has least two different wavelengths of LEDs or two different color temperature white LEDs, the luminaire is substantially longer than its PCBA width by at least a ratio of 10 to 1 or 20 to 1.

In an exemplary embodiment, the luminaire device of the previous paragraph that has two input power wires that are used for powering the light and transmitting data signals to control the intensity and color output of the light where the data signals could contain intensity data or color data or both intensity and color data for example or the light could respond to Time Toggle Protocol (TTP) commands, Power Line Instruction (PLI) commands, or similar where the power is momentarily interrupted, e.g., with a switch by a user to select an intensity or color.

In an exemplary embodiment, a flexible linear strip luminaire that contains a distributed load intentionally used to dissipate power over the length of the linear luminaire and that does not transmit visible light where the total dissipated power of this load approximately equals the total power dissipated by the LEDs such that if the LEDs are switched off at some frequency to lower the intensity of the light, e.g., for dimming per se or for color mixing with other LEDS, then the non-light transmitting load will be used during the LED off times to maintain a nearly constant power.

In an exemplary embodiment, the LED luminaire described in any of the previous exemplary embodiments, wherein the luminaire has at two modes, a full brightness state in which the LEDs are outputting maximum light output and the LED luminaire draws an amount of power, and a dimmed state in which the LEDs are illuminated but are outputting less light output than the full brightness state and the LED luminaire draws about the same amount of power as in the full brightness state.

In an exemplary embodiment, a flexible LED luminaire, comprising a flexible substrate at least 10 or 20 or 25 times as long as it is wide and having a plurality of electrical conductors for connecting to adjacent electrical devices, a plurality of LED subsystems affixed to the flexible substrate, each LED subsystem including at least one LED, an LED driver having a power connection, a ground connection, and at least one driver connection for driving the at least one LED, and a Zener diode or resistor between the at least one driver connection and the ground connection of the LED driver.

In an exemplary embodiment, a flexible LED luminaire, comprising a flexible substrate at least 10 or 20 or 25 times as long as it is wide, having a first end and a second end, having a first plurality of electrical conductors at the first end for communications from a first adjacent flexible LED luminaire, and having a second plurality of electrical conductors at the second end for communications to a second adjacent flexible LED luminaire, wherein the first plurality of electrical conductors at the first end comprises an LED power line (i.e., at least one LED power line), a plurality of color ground lines, each color ground line for controlling one or more LEDs that generate one or more colors different from the other color ground lines; and a dark load control line for controlling a non-illuminating load to help balance power consumption by the flexible LED luminaire wherein the second plurality of electrical conductors at the second end comprises an LED power line, a plurality of color ground lines, each color ground line for controlling one or more LEDs that generate one or more colors different from the other color ground lines, and a dark load control line for controlling a non-illuminating load to help balance power consumption by the second flexible LED luminaire. As an example of power balancing, if the white LEDs are being dimmed by their control FET via PWM to 50% illumination, the dark load, e.g., a Zener diode, conducts and gets rid of the other 50% to balance power consumed by the luminaire.

In an exemplary embodiment, a flexible LED luminaire comprises a flexible substrate at least 10 or 20 or 25 times as long as it is wide, having a first end, and having a first plurality of electrical conductors at the first end, and a plurality of LED drivers, and wherein the first plurality of electrical conductors at the first end connects to a source power line and a ground line to be provided by a source of power; and wherein the plurality of LED drivers generates at least the following control lines, a plurality of color ground lines, each color ground line for controlling one or more LEDs that generate one or more colors different from the other color ground lines, and a dark load control line for controlling a non-illuminating load to help balance power consumption by the flexible LED luminaire.

In an exemplary embodiment, a flexible LED luminaire, comprises a flexible substrate at least 10 or 20 or 25 times as long as it is wide, having a first end and a second end, having a first plurality of electrical conductors at the first end, and having a second plurality of electrical conductors at the second end to communicate with an adjacent flexible LED luminaire, wherein the first plurality of electrical conductors at the first end connects to a source power line and a ground line to be provided by a source of power, and wherein the second plurality of electrical conductors at the second end comprises an LED power line, a plurality of color ground lines, each color ground line for controlling one or more LEDs that generate one or more colors different from the other color ground lines, and a dark load control line for controlling a non-illuminating load to help balance power consumption by the adjacent flexible LED luminaire.

In an exemplary embodiment, an LED luminaire according to any one of the foregoing paragraphs, further comprising a dark load control line for controlling a non-illuminating load to help balance power consumption by the LED luminaire.

In an exemplary embodiment, an LED luminaire according to any one of the foregoing paragraphs, further comprising circuitry generating a dark load control line for controlling a non-illuminating load to help balance power consumption by the LED luminaire.

In an exemplary embodiment, an LED luminaire according to any one of the foregoing paragraphs, further comprising circuitry that accepts as an input a dark load control line for controlling a non-illuminating load to help balance power consumption by the LED luminaire.

In an exemplary embodiment, an LED luminaire according to any one of the foregoing paragraphs, further comprising a flexible substrate at least 10 or 20 or 25 times as long as it is wide and having a plurality of electrical conductors for connecting to adjacent electrical devices; a plurality of LED subsystems affixed to the flexible substrate, each LED subsystem including at least one LED, an LED driver having a power connection, a ground connection, and at least one driver connection for driving the at least one LED, and a Zener diode or resistor between the at least one driver connection and the ground connection of the LED driver.

In an exemplary embodiment, an LED luminaire, comprises LEDs, an LED driver, and a non-illuminating load to dissipate power in the LED luminaire that does not transmit visible light outside the luminaire, wherein the total dissipated power of the non-illuminating load and LEDs in an OFF mode approximately equals the total power dissipated by the LEDs when ON such that if the LEDs are switched OFF at some frequency to lower the intensity of the light, then the non-illuminating load will be used during the LED OFF times to maintain a nearly constant power for the LED luminaire, e.g., low ripple on the power supply.

In an exemplary embodiment, a method of controlling an LED luminaire, comprises driving at least some LEDs ON and OFF, controlling a non-illuminating load to dissipate power in the LED luminaire such that when the LEDs are switched OFF, then the non-illuminating load is used during the LED OFF times to maintain a nearly constant power for the LED luminaire, e.g., low ripple on the power supply.

In an exemplary embodiment, a method of controlling an LED luminaire, comprises driving a first plurality of LEDs ON and OFF, driving a second plurality of LEDs OFF while the first plurality of LEDs is ON, driving the second plurality of LEDs ON while the first plurality of LEDs is OFF, controlling a non-illuminating load to dissipate power in the LED luminaire such that the non-illuminating load is used to maintain a nearly constant power for the LED luminaire, e.g., low ripple on the power supply, both while the second plurality of LEDs is OFF and the first plurality of LEDs is ON, and while the second plurality of LEDs is ON and the first plurality of LEDs is OFF.

In an exemplary embodiment, an LED luminaire according to any one of the foregoing paragraphs, wherein a/the Zener diode or resistor is connected to the dark load control line.

In an exemplary embodiment, an LED luminaire according to any one of the foregoing paragraphs, wherein the dark load control line is connected to the ground connection of the LED driver.

In an exemplary embodiment, an LED luminaire according to any one of the foregoing paragraphs, wherein the luminaire has less than 300 mV ripple on its power line (ripple values herein are peak-to-peak, steady-state) while displaying a color at maximum illumination requiring significant switching of LEDs, e.g., while displaying the color purple requiring significant switching of red and blue LEDs.

In an exemplary embodiment, an LED luminaire according to any one of the foregoing paragraphs, wherein the luminaire has less than 200 mV ripple on its power line while displaying a color at maximum illumination requiring significant switching of LEDs, e.g., while displaying the color purple requiring significant switching of red and blue LEDs.

In an exemplary embodiment, an LED luminaire according to any one of the foregoing paragraphs, wherein the luminaire has less than 150 mV ripple on its power line while displaying a color at maximum illumination requiring significant switching of LEDs, e.g., while displaying the color purple requiring significant switching of red and blue LEDs.

In an exemplary embodiment, an LED luminaire according to any one of the foregoing paragraphs, wherein the luminaire has less than 100 mV ripple on its power line while displaying a color at maximum illumination requiring significant switching of LEDs, e.g., while displaying the color purple requiring significant switching of red and blue LEDs.

In an exemplary embodiment, an LED luminaire according to any one of the foregoing paragraphs, wherein the luminaire has an LED driver switching frequency of 240-24,000 Hz for creation of colors using light combined from different LEDs.

This Summary is provided merely for purposes of summarizing some example embodiments to provide a basic understanding of some aspects of the disclosure. Accordingly, it will be appreciated that the above described exemplary embodiments are merely examples and should not be construed to narrow the scope or spirit of the disclosure in any way. Other embodiments, aspects, and advantages of various disclosed embodiments will become apparent from the following detailed description taken in conjunction with the accompanying drawings which illustrate, by way of example, the principles of the described embodiments.

BRIEF DESCRIPTION OF THE DRAWINGS

Features, objects and advantages other than those set forth above will become more readily apparent when consideration is given to the detailed description below. Such detailed description makes reference to the following drawings:

FIGS. 11A.1-11A.II and 11B.I-11B.II illustrate a left-hand and right-hand portion of the circuit board of FIG. 3;

DETAILED DESCRIPTION

Figure 1:
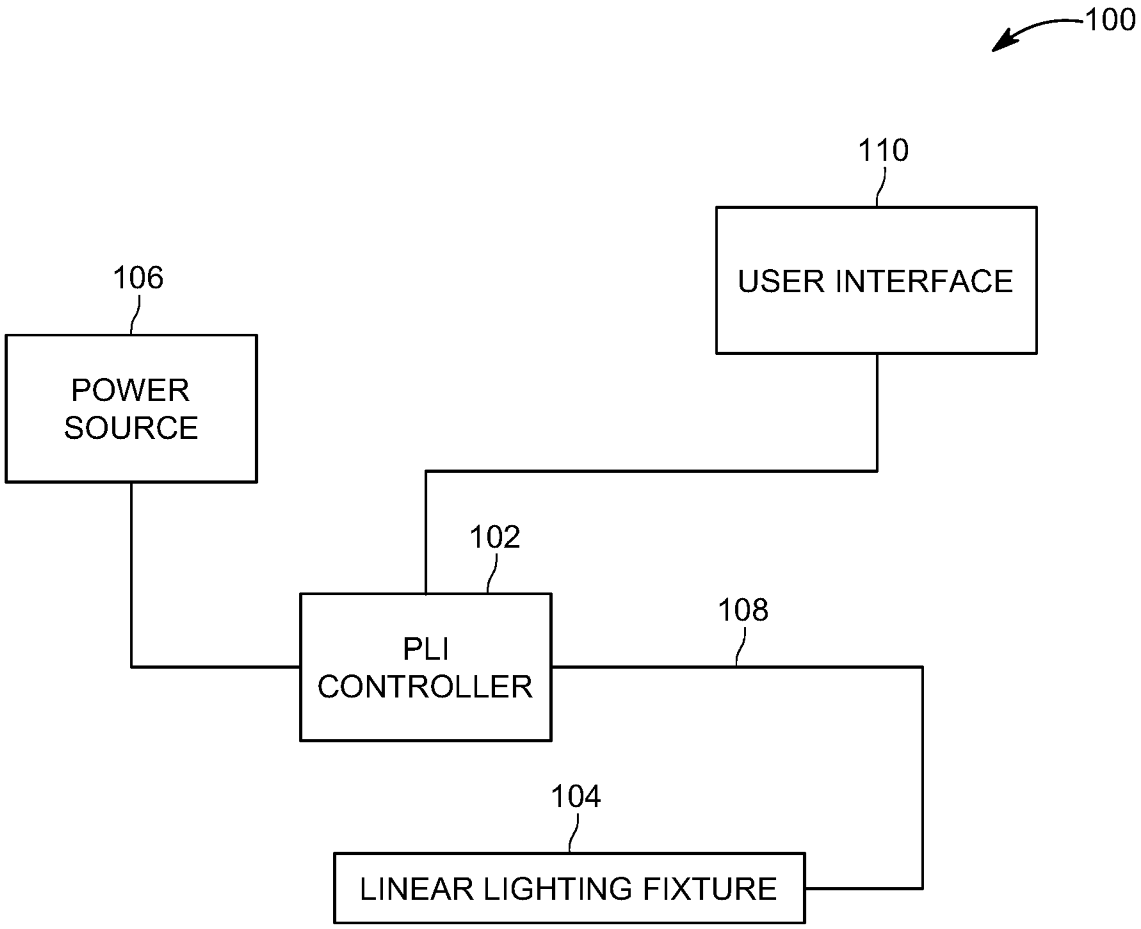
FIG. 1 illustrates a block diagram of a lighting control system according to an exemplary embodiment.

FIG. 1 illustrates a block diagram of an exemplary lighting control system 100. The exemplary lighting control system 100 comprises a power line instruction (PLI) controller 102 and at least one lighting fixture 104. As will be described in more detail herein, the light fixture comprises a housing, light source, which in certain embodiments, is capable of producing light in a plurality of colors by mixing light output by certain colored sources. The lighting fixtures comprise power supplies to regulate the power supplied to the light sources of the lighting fixture 104 and to provide power to switching and control circuitry comprised by the lighting fixture 104. As shown, a power source 106, such as, but not limited to a direct current vehicle electrical system, e.g., the power system of a ship, boat, car, truck, tractor, trailer, etc. With regard to the at least one light fixture 104, electrical power from the power supply 106 is provided to the PLI controller 102 which then passes the electrical power to the at least one lighting fixture 104 via a power bus 108. In many cases, this power bus 108 will be a wiring harness installed in a vehicle (such as a boat) or other system that communicates power from the power source 106 to various points of use, for example, the lighting fixture 104. While the term "relay" or "switch" may be used herein, certain embodiments may employ solid state devices such as MOSFETs and equivalent switching semiconductor devices.

Also illustrated is a user interface (U/I) system 110 that permits a user to interact with a menu in order to control lighting fixtures such as the lighting fixture 104 illustrated. In exemplary embodiments, control signals are provided from the PLI controller 102 to the lighting fixture(s) 104 via the power bus 108, avoiding the requirement for separate control wires, or potentially unreliable wireless communication methods. The technical advantages of the systems and methods described herein will be better understood and become more readily apparent according to the following examples described herein.

In an exemplary embodiment, a linear light strip 104, which also may be referred to as flex lighting or strip lighting is a luminaire with an array of LEDs placed on a circuit board substantially longer than its width allowing for an illumination pattern corresponding to the luminaire's length. It will be understood by one of ordinary skill in the art that, although this disclosure describes primarily linear lighting strips, other configuration may be formed using the control and power regulating techniques described herein. For instance, a lighting fixture may be square or round with the array of LEDs arranged as appropriate for the particular shape of the luminaire desired. However, linear lighting is typically space constrained and as such suffers from two primary problems. The first problem is that any control in intensity or color generally requires an external device. In such embodiments, the external device controls brightness by either reducing the voltage to the strip light or Pulse Width Modulating (PWM) the voltage. Many linear lighting strip lights have multiple wavelength LEDs distributed throughout the luminaire. For example, some linear lights contain Red, Green, Blue, and White LEDs (RGBW). This example would be considered a 4-channel light and generally known embodiments require 5 wires to power and control the light—1 Anode and 4 Cathodes. The external device is typically used to control each of the RGBW colors. As is known in the art, virtually any color can be produced by setting the output level for each of the colors independently. As may be apparent, such implementations come with an increased cost in component and assembly complexity. Another issue with typical linear lighting devices results from the use of the external controller. Electrical noise is easily radiated or conducted during the operation of these devices because the controller pulses large electrical currents to the LEDs while generating the various colors and intensity levels. This emitted noise can then interfere with audio and communication systems that may be located nearby to lighting control system 100, rendering them difficult to use or decreasing their performance when the lighting control system 100 is operating.

Figure 2:
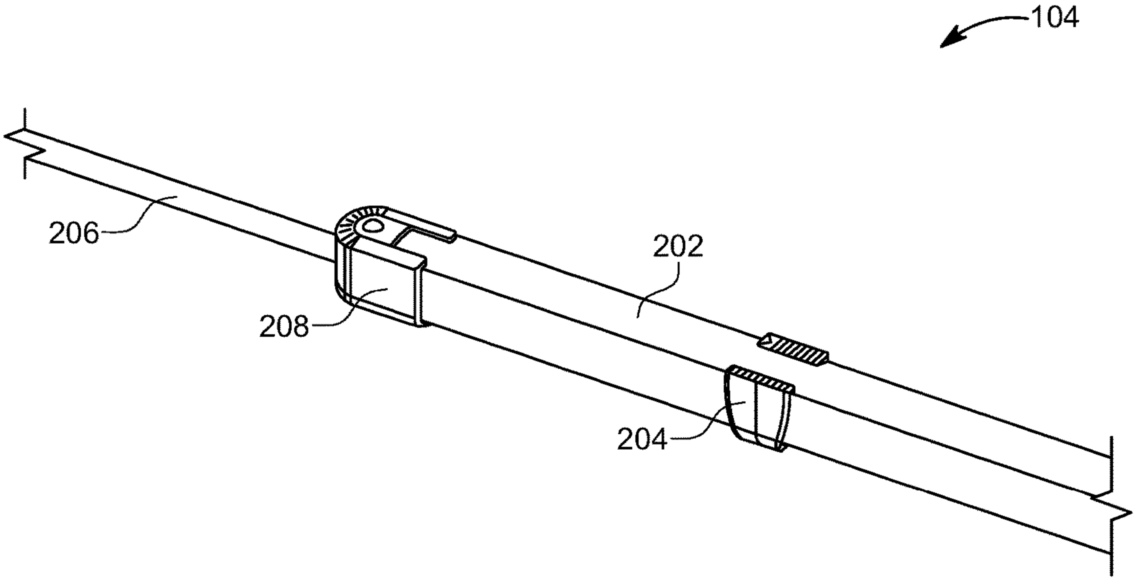
FIG. 2 illustrates a partial image of a strip lighting device according to an exemplary embodiment.

FIGS. 2 illustrates the housing of an exemplary linear lighting fixture 104 according to an exemplary embodiment. As illustrated, the fixture 104 has an elongated housing structure 202 which may be secured using one or more mounting clips 204. Also shown is a power supply cord 206 which enters an end 208 of the fixture 104. Then fixture end 208 may also function to secure the fixture 104 in a manner similar to the clip 204.

Figure 3:
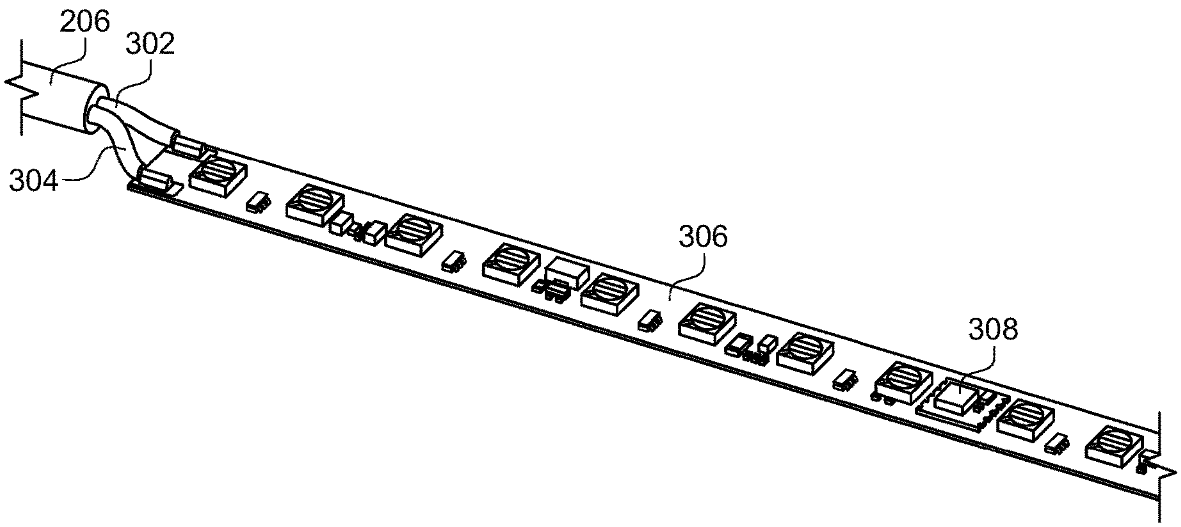
FIG. 3 illustrates a partial image of a circuit board and power connection used in the strip lighting device of FIG. 2.

FIG. 3 illustrates a view of the linear light fixture 104 with its housing 202 removed. As is shown, the power supply cord 206 reveals two conductors 302 and 304. A printed circuit board 306 is also illustrated. The printed circuit board 306 may be a conventional rigid or semi-rigid design or, in certain embodiments, may be a flexible circuit board. In order to improve the reliability of such a flexible circuit board, certain components may be mounted to the circuit board 306 on smaller (daughter board) circuit boards as illustrated at 308. These daughter boards 308 can improved the reliability of a flexible circuit board by providing a larger interface between the components of the daughter board 308 than would be the case if those components were mounted directly to the flexible circuit board. In an exemplary embodiment of a linear lighting fixture 100 an integrated microcontroller is used to remove the requirement for an external controller. That is, in exemplary embodiments, a controller (in addition to the controllers in the LED drivers) is provided on the circuit board 306. In some exemplary embodiments, the integrated microcontroller is mounted to the daughter board 308, which is soldered to the circuit board 306.

Figure 4A:
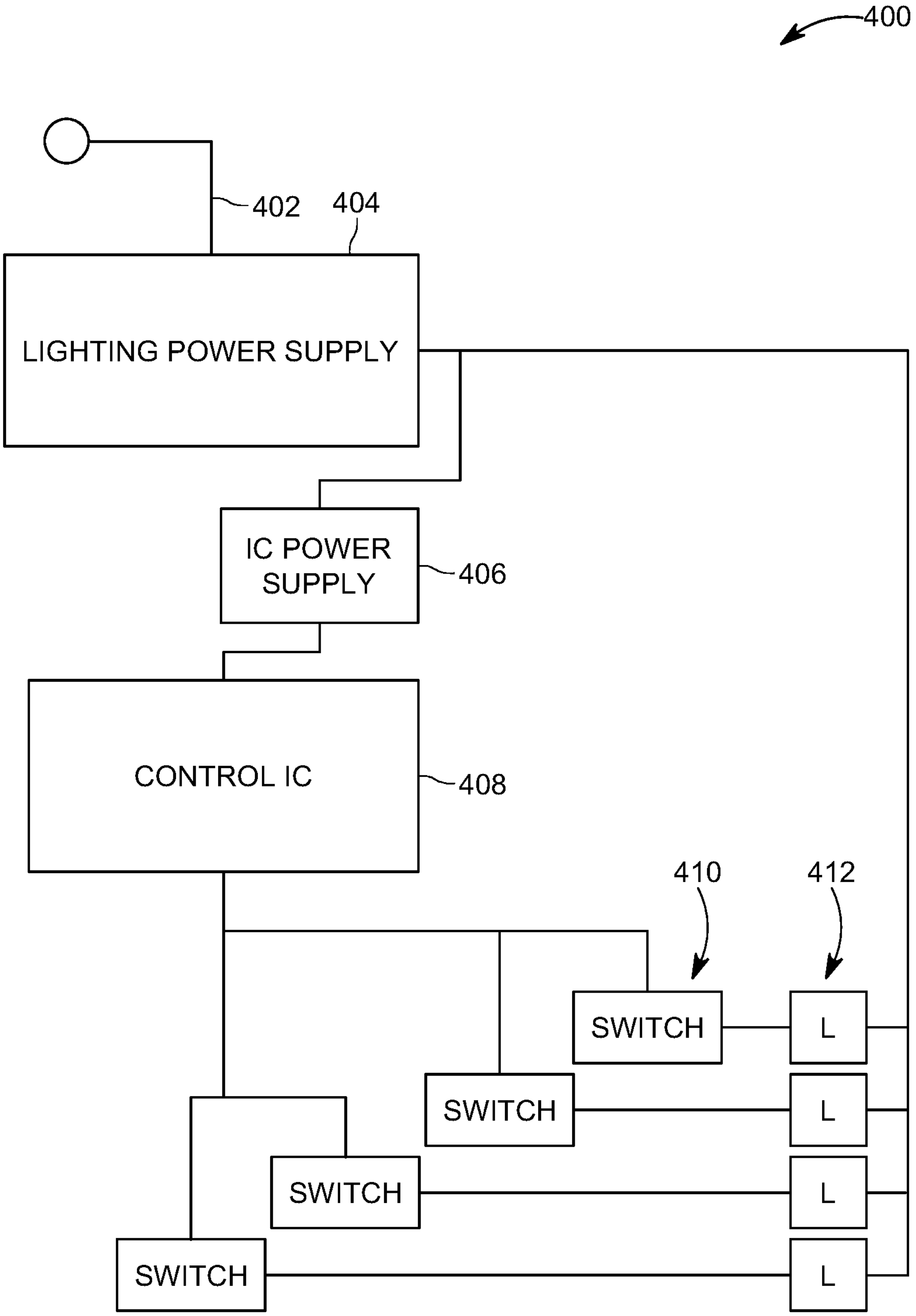
FIG. 4A illustrates a block diagram of a strip lighting device according to an exemplary embodiment.

Referring to the block diagram of an exemplary embodiment of linear light fixture 400 shown in FIG. 4A, The fixture 400 is powered and controlled by two input power wires; one positive (e.g., 10-30 VDC, such as 12 VDC) and one negative (e.g., DC ground), shown in the block diagram as a single supply line 402. A lighting power supply 404 provides regulated power to the fixture derived from the supply line 402. In certain exemplary embodiments, a second power supply 406 is used to provide a regulated power supply to the control circuitry 408. As will be described later herein, the control circuitry 408 may comprise a microcontroller that receives and interprets instructions from a PLI controller 102 (or that receives and interprets other instructions, such as TTP instructions; see Appendix T to the '633 Application). The control circuitry 408 is in communication with a plurality of switches 410, which in exemplary embodiments are semiconductor devices such as FETs. As illustrated, each switch is connected to a specific color of LED 412, e.g., one switch 410 for R (red LEDs), one switch 410 for G (green LEDs), one switch 410 for B (blue LEDs), and one switch 410 for W (white LEDs). In exemplary implementations, the red LEDs will be distributed along the length of the PCB in various RGBW LEDs, the green LEDs will be distributed along the length of the PCB in various RGBW LEDs, the blue LEDs will be distributed along the length of the PCB in various RGBW LEDs, and the white LEDs will be distributed along the length of the PCB in various RGBW LEDs, with one or more RGBW LEDs having its own or sharing a driver (see FIGS. 5A-10). As shown, in an exemplary embodiment, these LEDs 412 (and their drivers) are connected to the lighting power supply 404. Not illustrated for sake of clarity is the connection between the switches 410 and a return conductor to the ground of the lighting power supply 404 (or common ground, e.g., the ground of power line 402). Thus, when a switch 410 is closed, power flows from the lighting power supply 404, through the LED 412 and switch 410 back to the power supply 404 (or to a common ground), creating a circuit that supplies power to the LED 412. Thus, in an exemplary embodiment, all of the switching required to create the various colors and intensity levels is built within the linear luminaire. This solution simplifies the installation process by reducing the number of wires to connect as well as the cost of the cable and other required external components.

In an exemplary embodiment, control of a linear light fixture 400 with an integrated microcontroller 408 is attained by turning the power line 402 off and then back on through a technology known Time Toggle Protocol (TTP) (see Appendix T to the '633 Application) or through digital 32-bit messages known as Power Line Instruction (PLI) commands. Details of exemplary PLI control systems and methods can be found in U.S. application Ser. No 16/575,922, which is incorporated by reference herein. In certain embodiments, this control allows for full color and intensity control through a simple toggle switch (electronic or mechanical), two wires and a power source. More precise control can be attained with the use of a digital PLI controller 102 whereby allowing the operator to use a user interface 110 as illustrated in FIG. 1, to control color and intensity output.

Figure 4B:
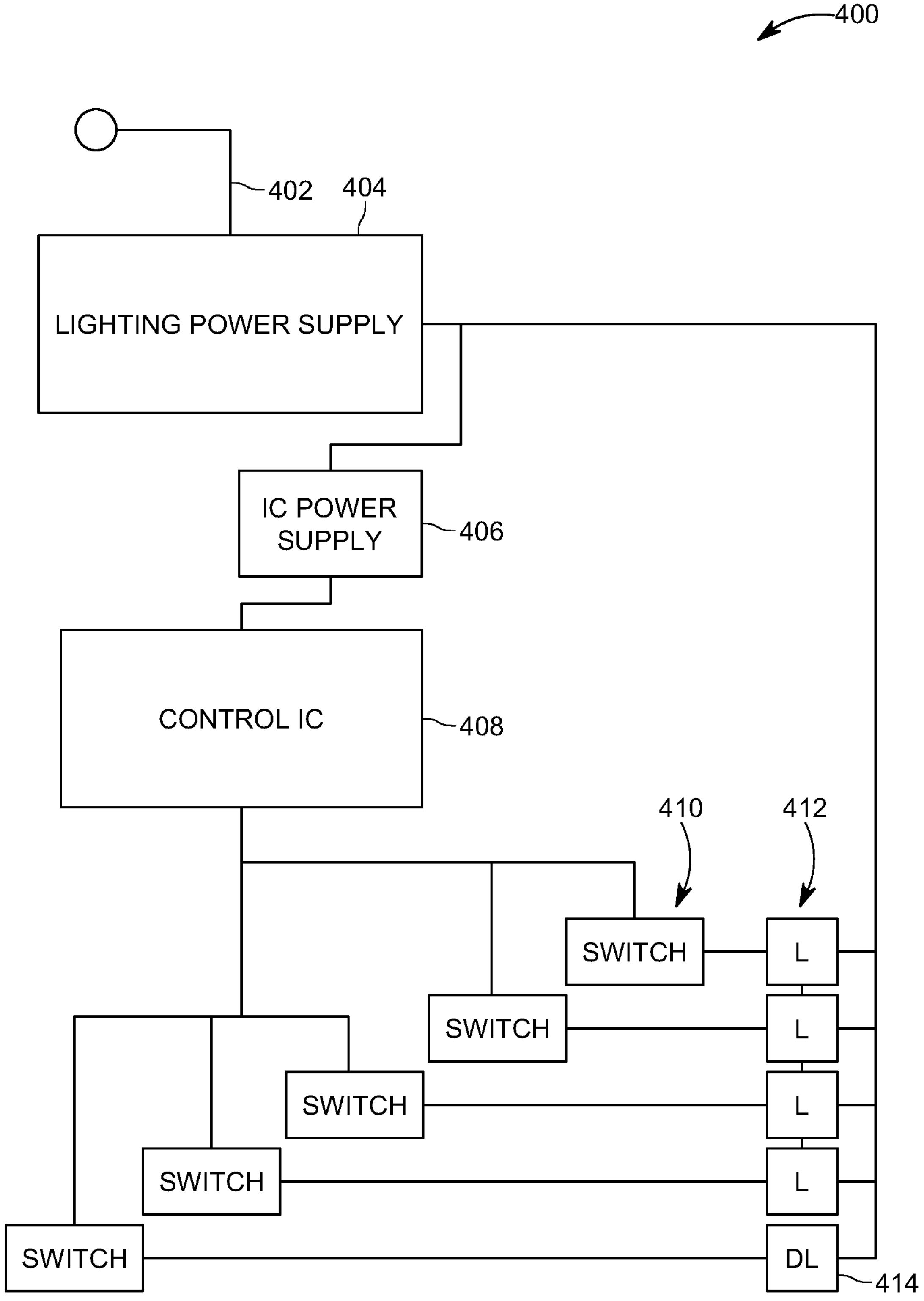
FIG. 4B illustrates a block diagram of a strip lighting device according to another exemplary embodiment.
Figure 5A:
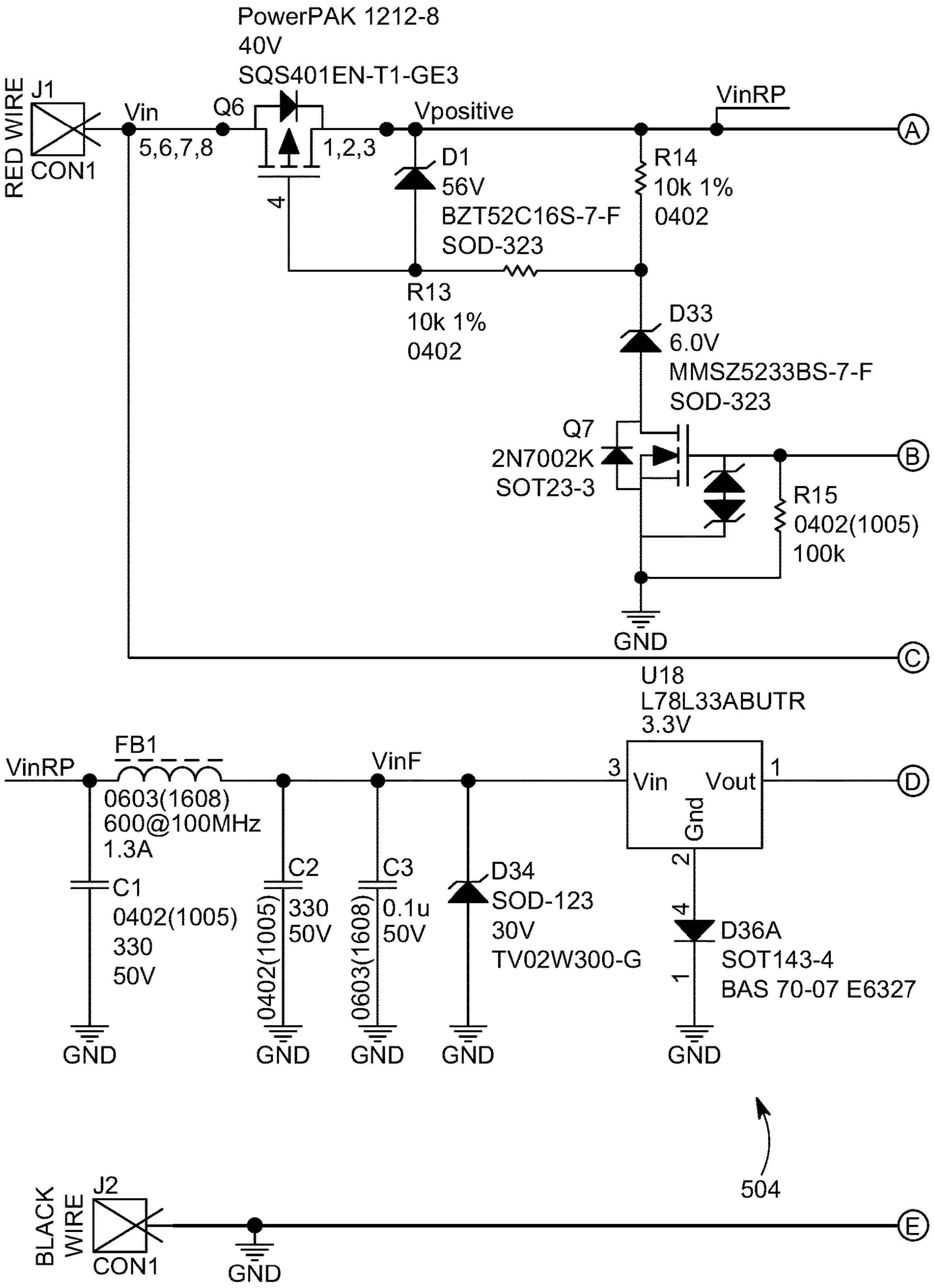
FIGS. 5A-5E illustrate a schematic diagram of circuitry of the block diagram of FIG. 4B according to an exemplary embodiment.
Figure 5B:
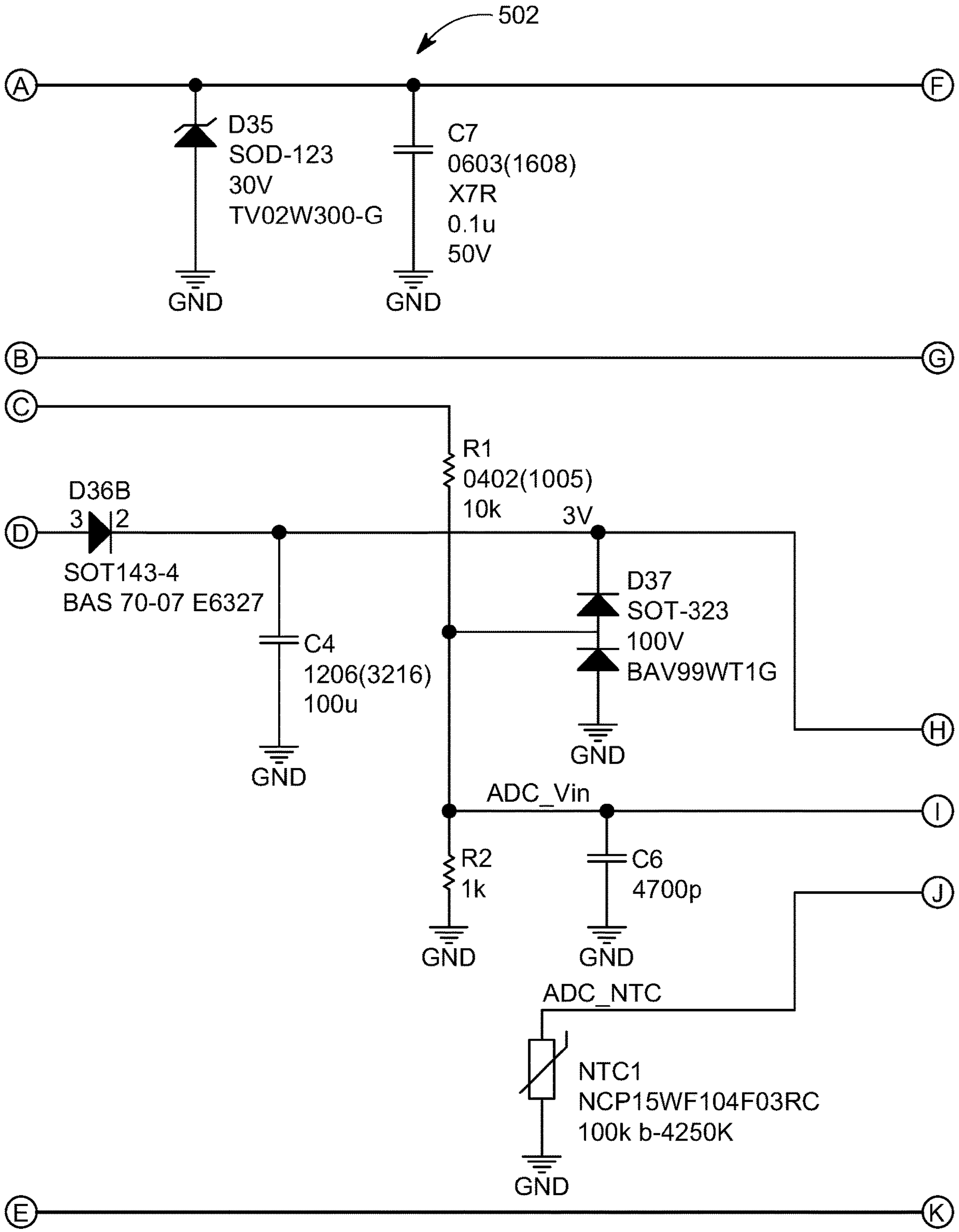
Figure 5C:
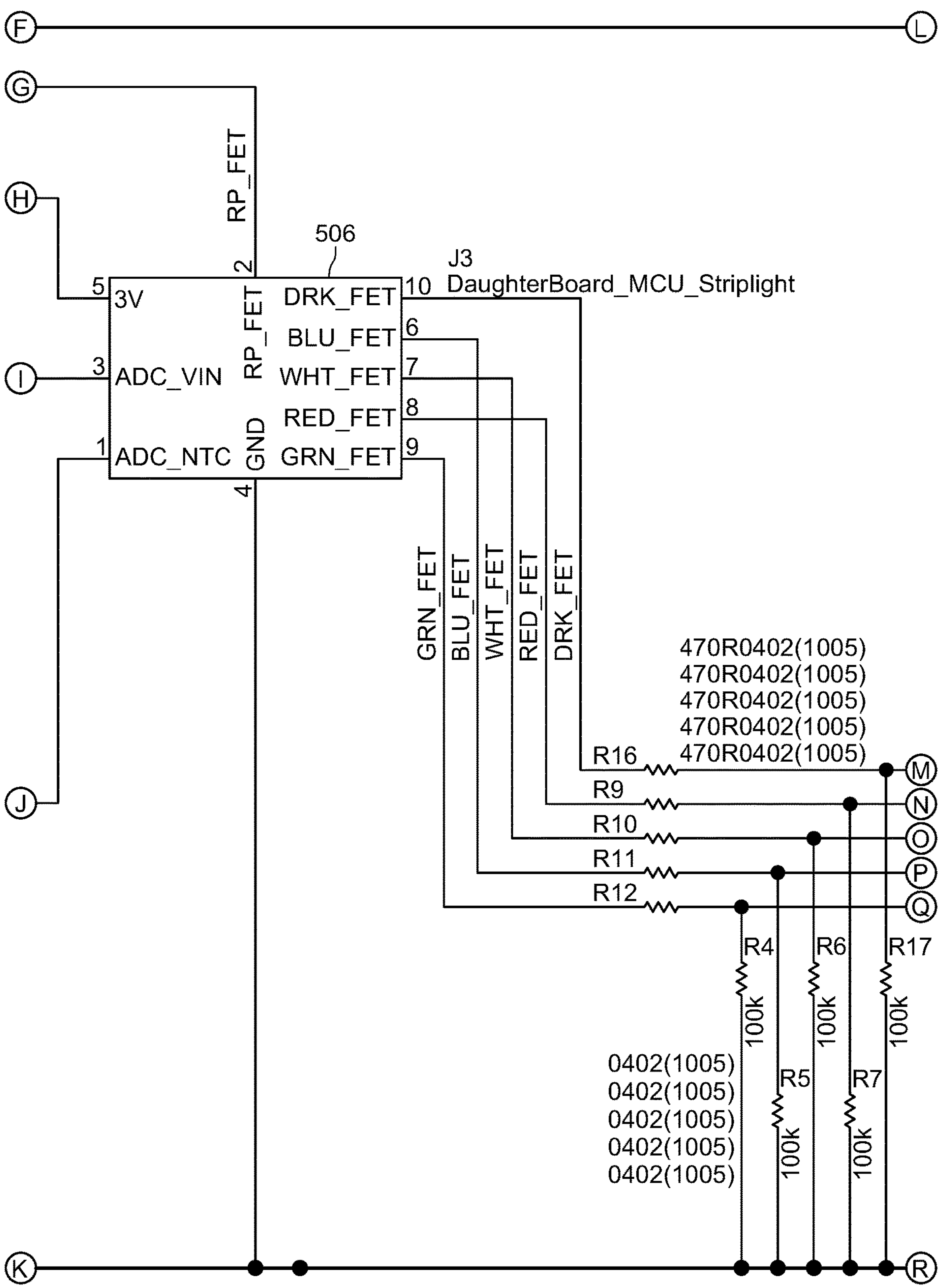
Figure 5D:
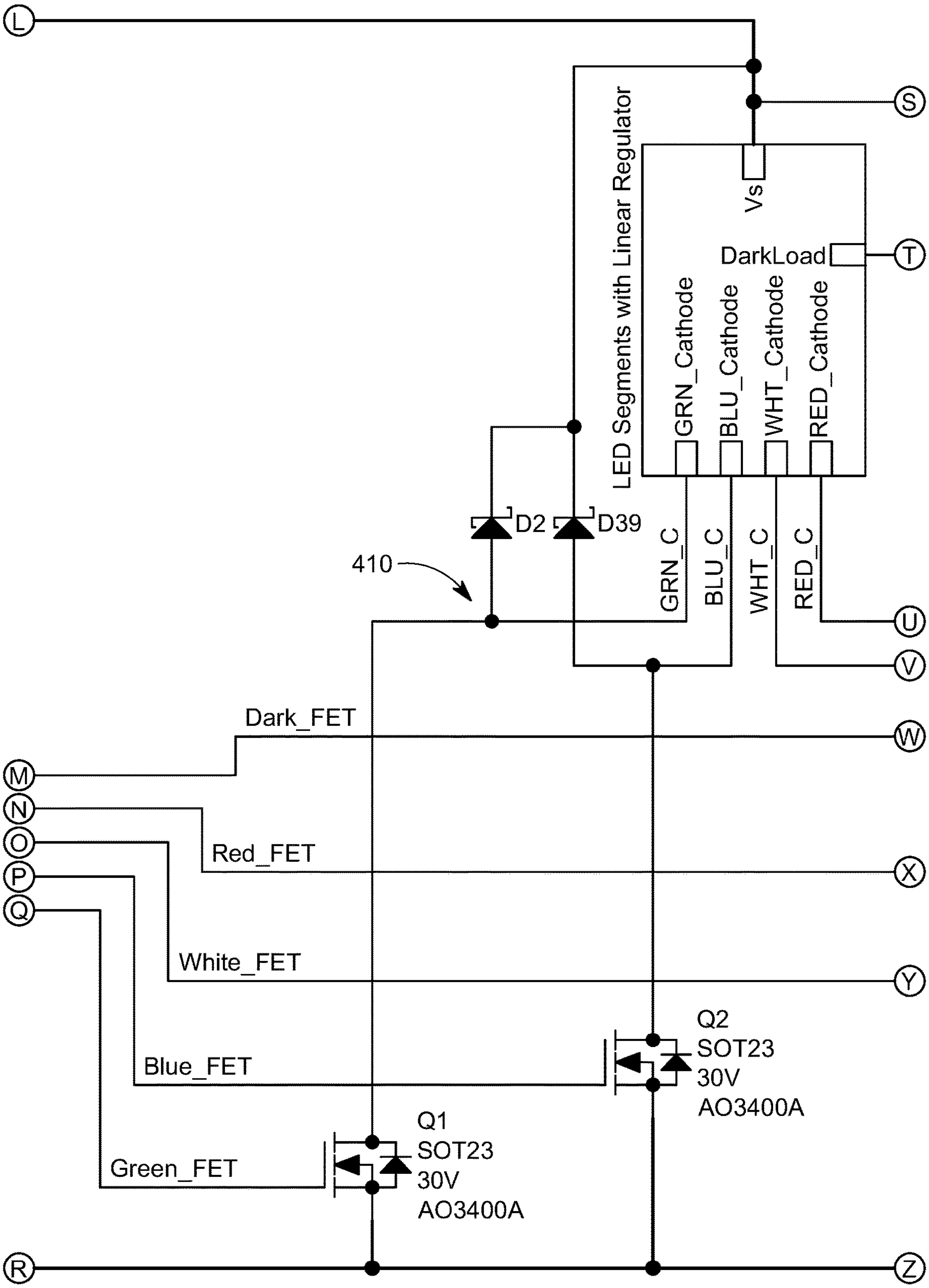
Figure 5E:
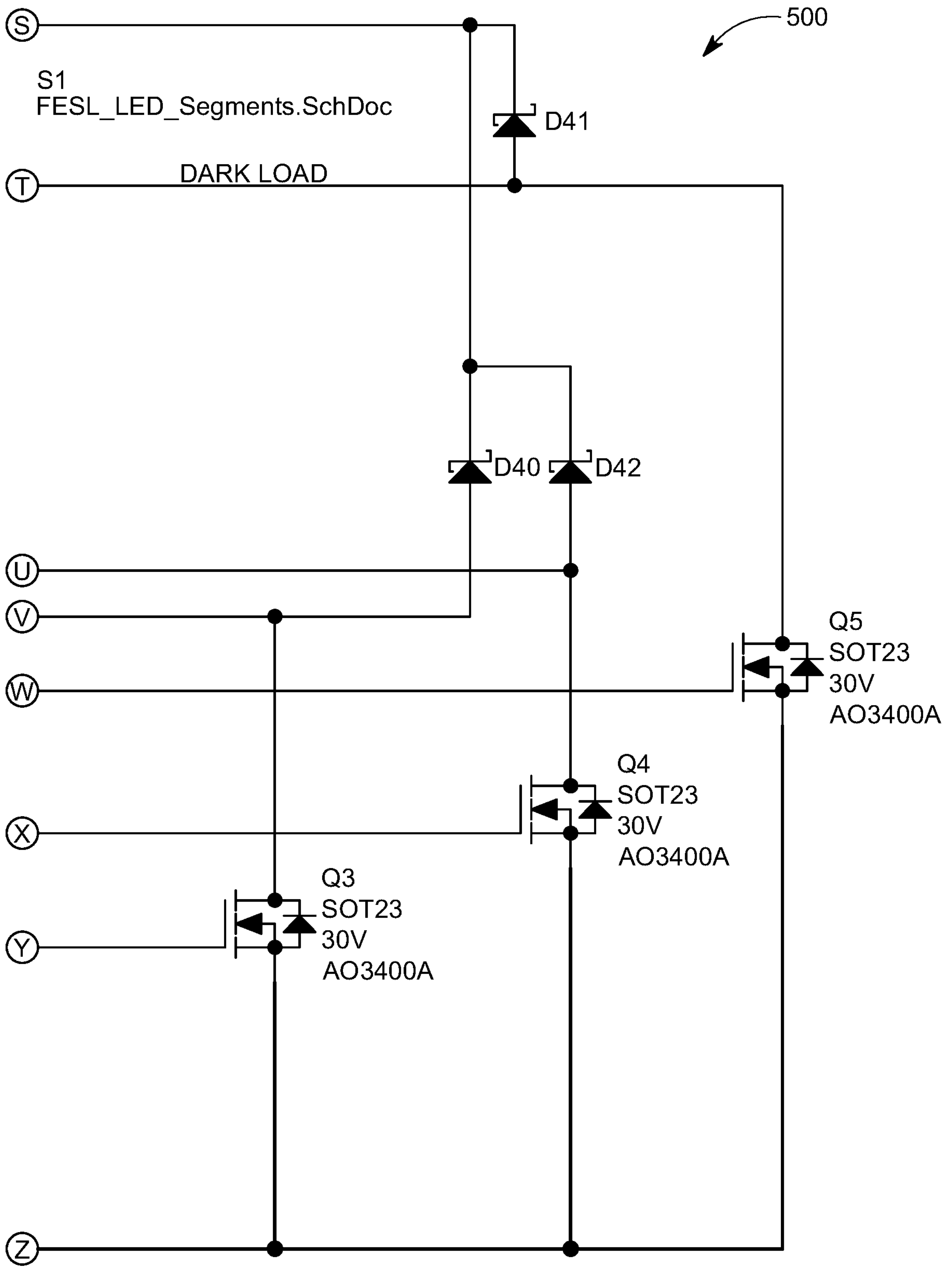

As shown in FIG. 4B, exemplary embodiments include a dark load 414 that can be controlled by controller 408 via another switch 410 to balance the power used by luminaire 400, e.g., reduced ripple along the lower line 402, as discussed herein. In exemplary embodiments, dark load 414 comprises a voltage regulator, such as a Zener diode, which can automatically balance the power used by luminaire 400. In other exemplary embodiments, dark load 414 comprises resistive loads, e.g., resistors or FETS, controlled by controller 408 to balance the power used by luminaire 400 under control of the controller 408.

FIGS. 5A-10 schematically illustrate an exemplary implementation 500 of the circuit of FIG. 4B. Referring now to FIGS. 5A-6C, the circuitry shown at 502 represents an exemplary embodiment of the lighting power supply 404. The integrated circuit power supply 406 is represented by the circuit shown at 504. The daughter board that includes the microcontroller is illustrated as a diagram showing its electrical connections at 506. The FET switches 410 are also illustrated as connected to and controlled by the daughter board 506. Block 508 (FIGS. 6A-6C) represents the circuitry of the light portion of the circuit. This block 508 will be described in more detail herein.

Figure 6A:
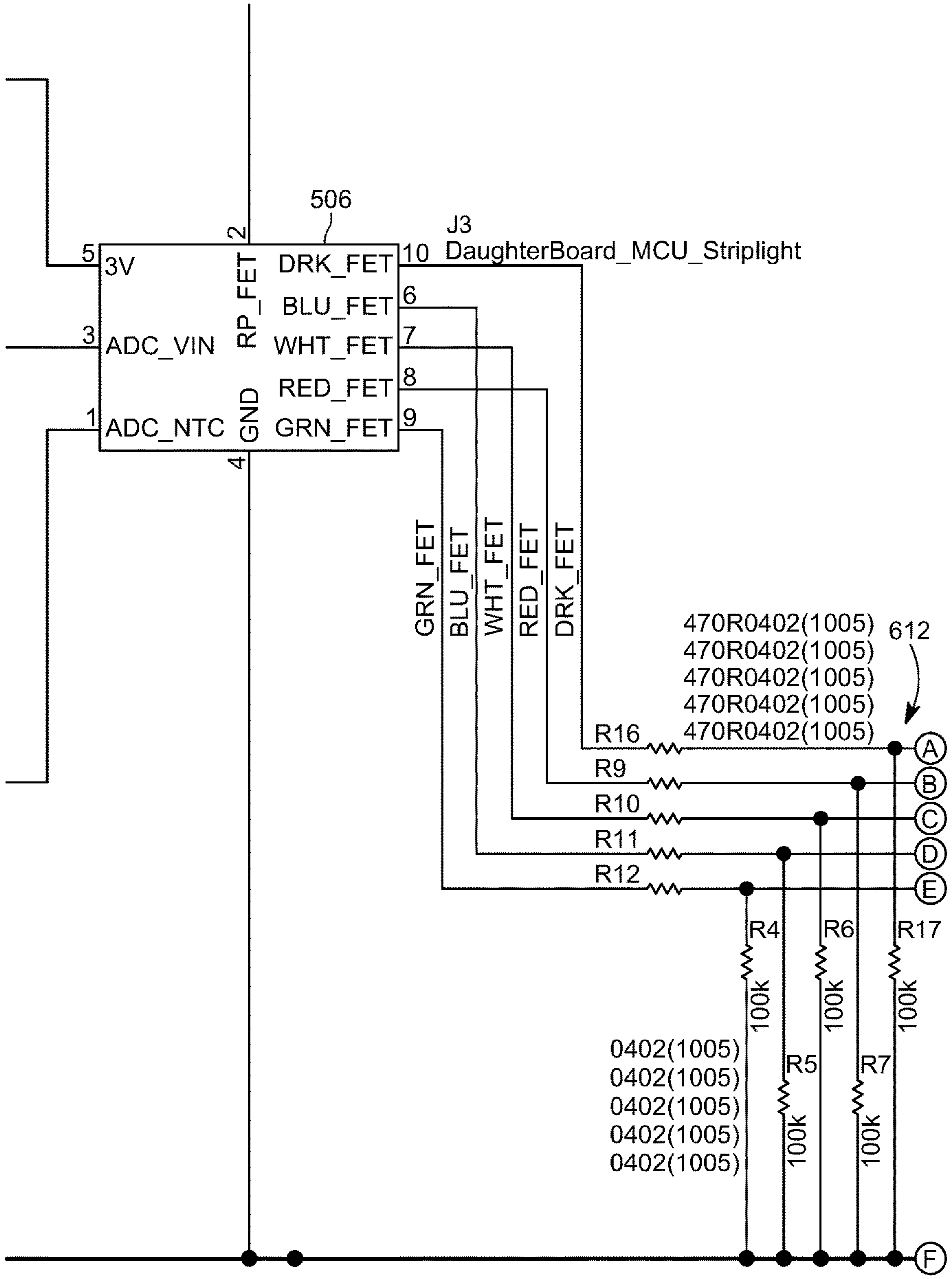
FIGS. 6A-6C illustrate a schematic of the control, switch and a LED and driver portion of a lighting sub circuit according to an exemplary structure of a data transmission generated by a controller according to an exemplary embodiment.
Figure 6B:
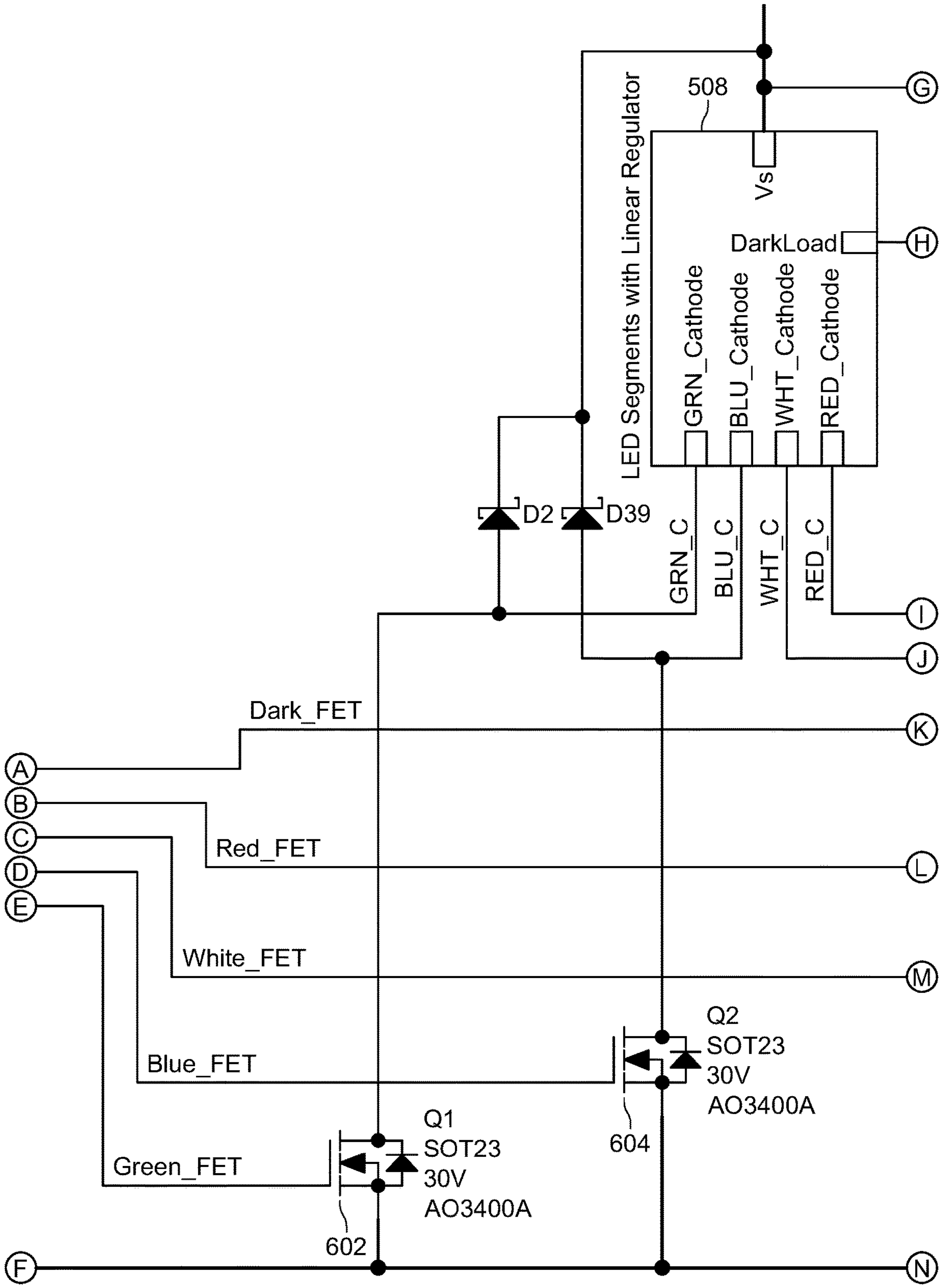
Figure 6C:
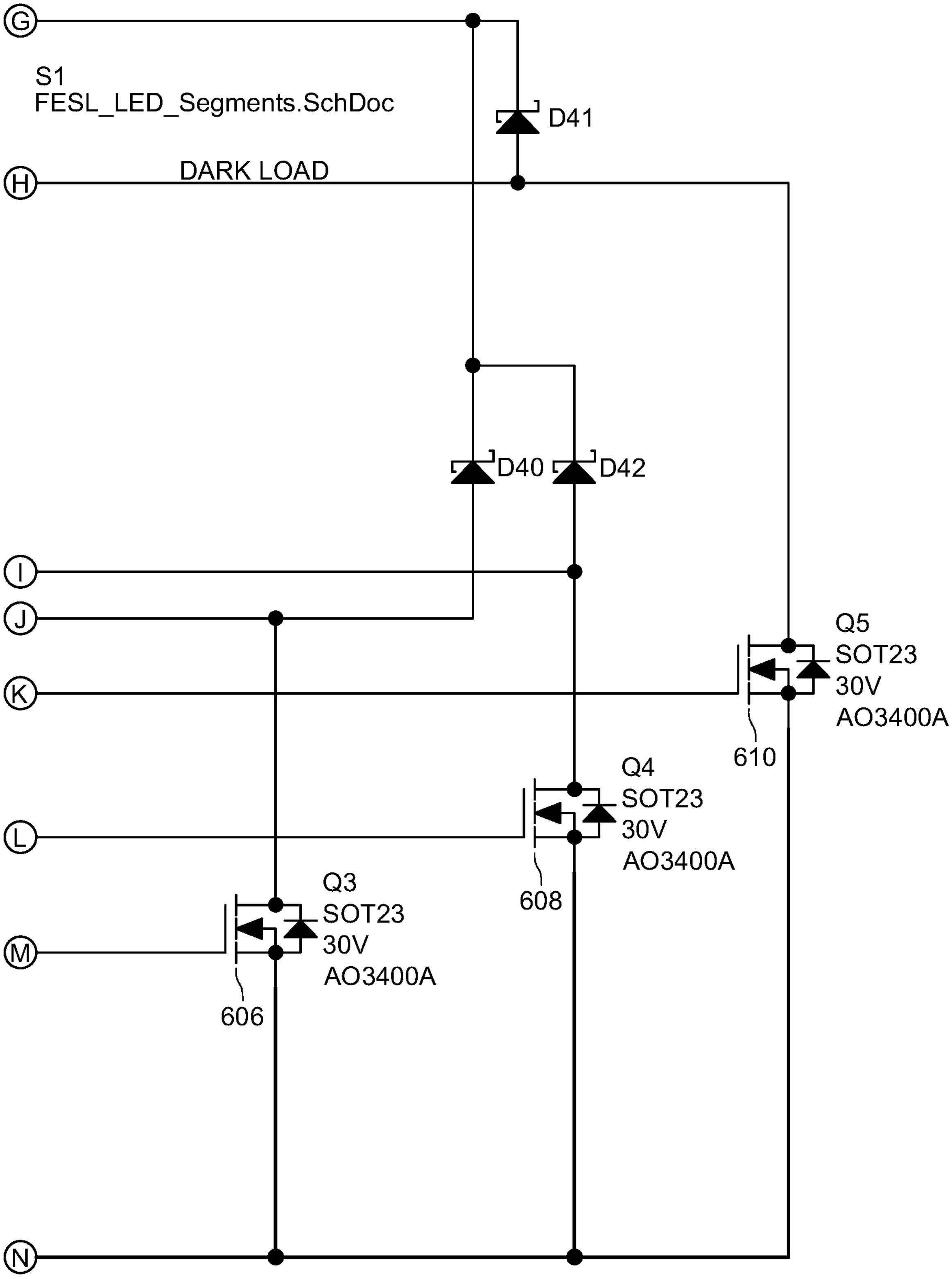

FIGS. 6A-6C show an expanded view of a section of the circuit of FIGS. 5A-5E that includes the daughter board 506, the connections to the light circuitry represented by block 508, and the FET switches 410. As shown, five FETs 602, 604, 606, 608, and 610 are connected to the daughter board through a resistor network 612. These FETs 602, 604, 606, 608, and 610 drive the R, G, B, W, and Dark Load signals generated by the daughter board 508.

Figure 7:
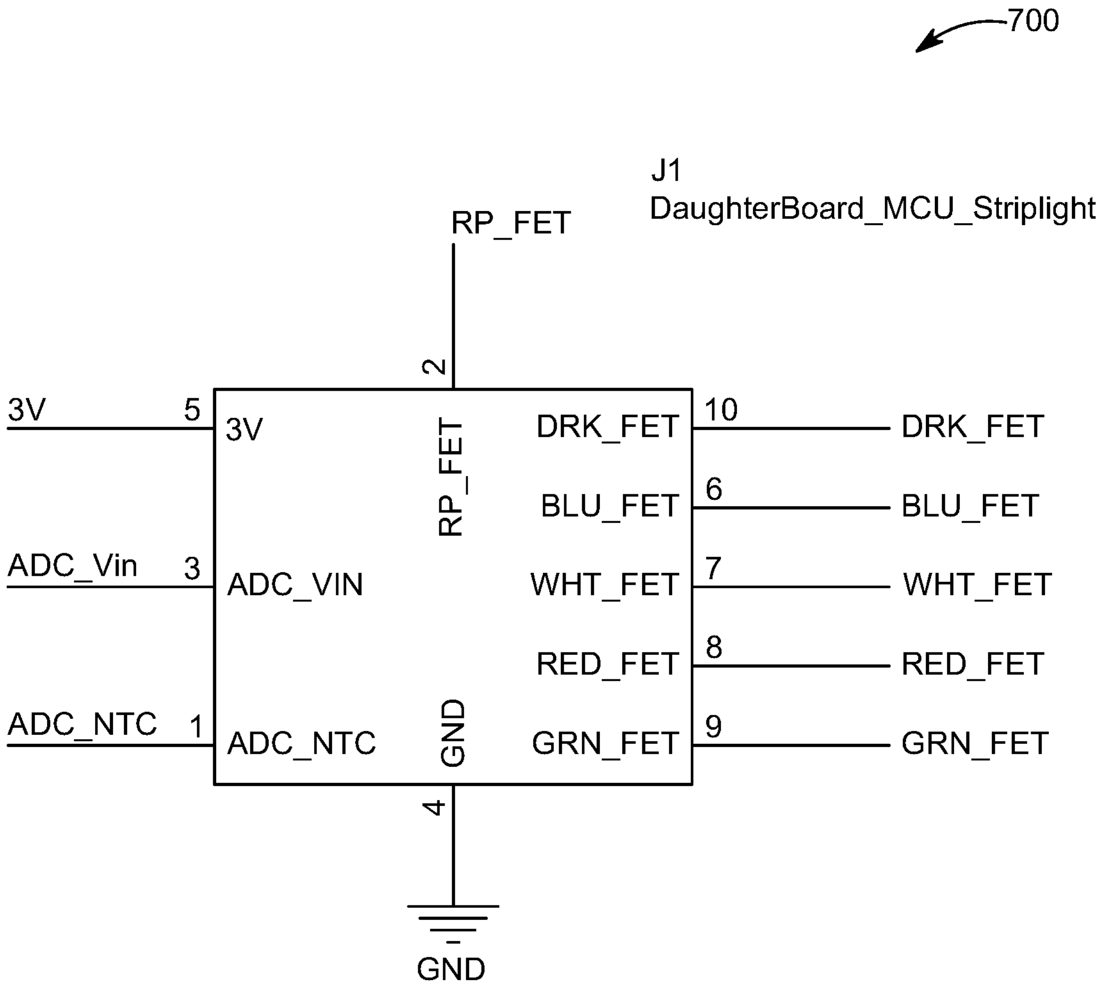
FIG. 7 illustrates diagram of a controller daughterboard of a strip lighting device according to an exemplary embodiment.
Figure 8:
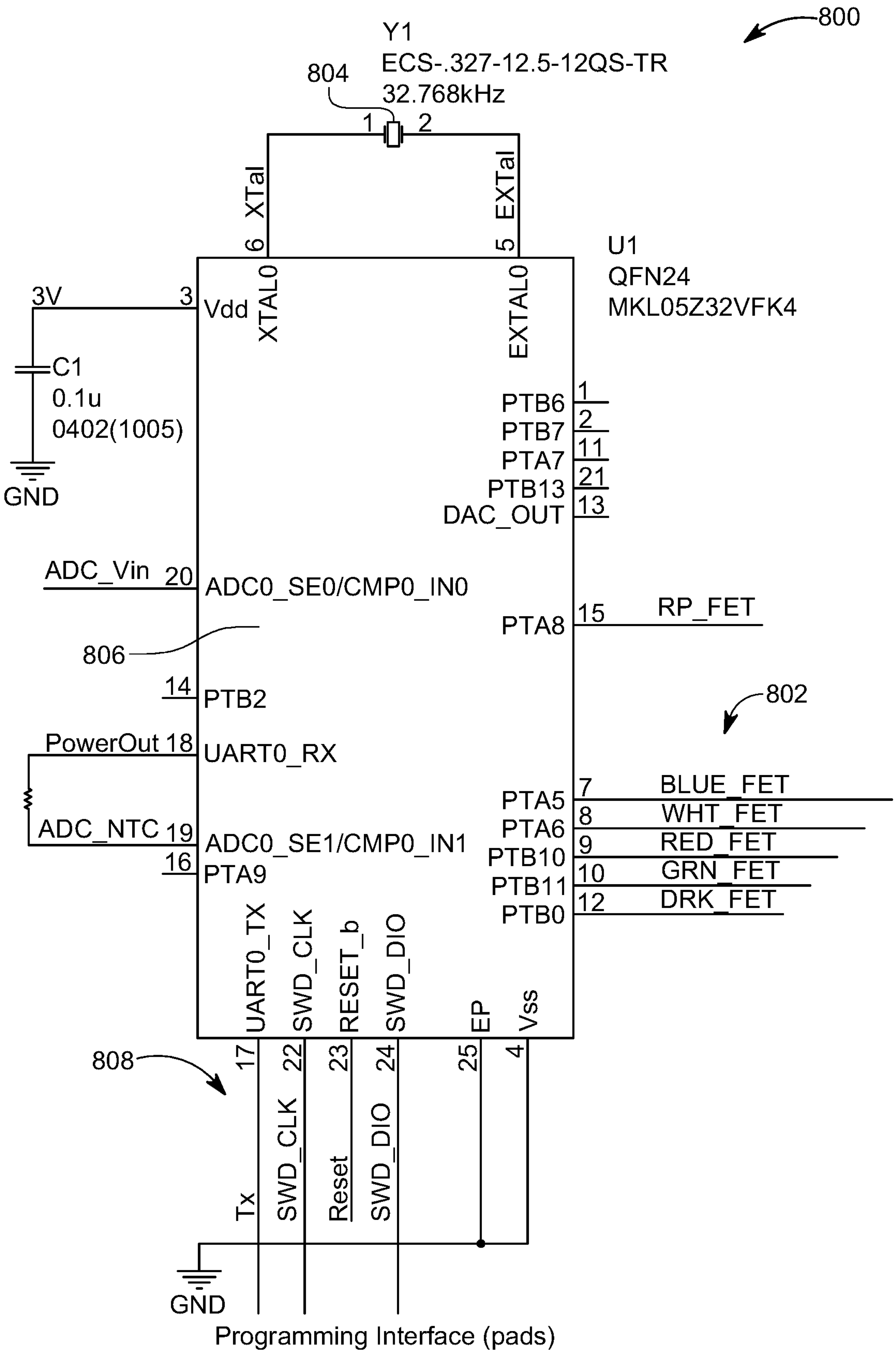
FIG. 8 illustrates a schematic of the daughter board of FIG. 6.

An enlarged view of the daughter board pinout connections 700 is shown in FIG. 7. FIG. 8 is a schematic diagram 800 of the daughterboard 506. Illustrated are connections 802 that connect to the switches 602-610 of FIG. 6. A clock crystal 804 is connect to the microcontroller 806 to provide the clock signal needed for operation by the microcontroller 806. In order to enable the microcontroller 806 to be programmed, programming interface connections 808 are connected to pads formed on the daughterboard 506. Thus, the daughterboard can be placed in a programming fixture (not shown) during production and programming instructions uploaded via the programming interface connections 808.

Figure 9A:
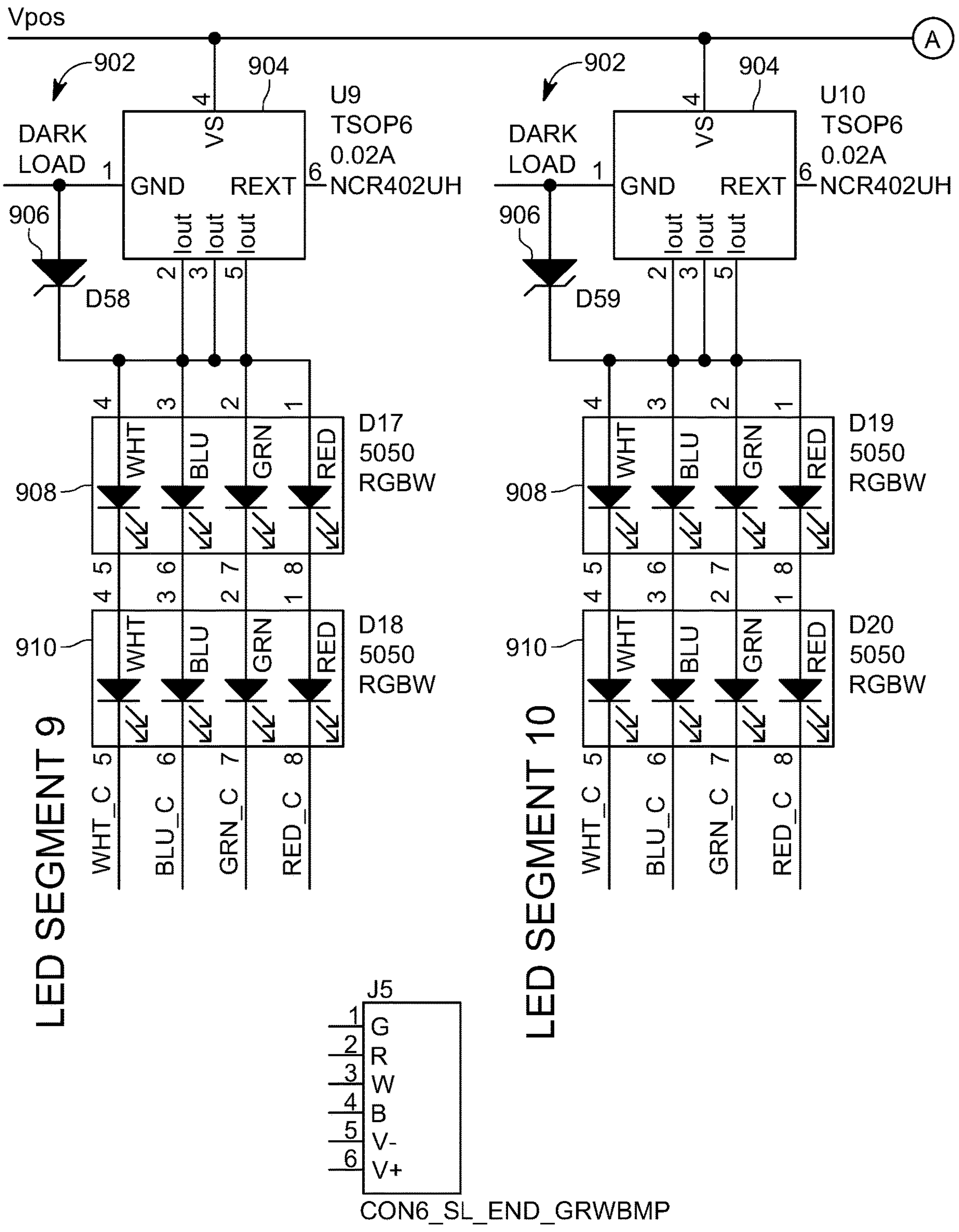
FIG. 9A-9B illustrate a schematic diagram showing LED segments used in an exemplary embodiment.
Figure 9B:
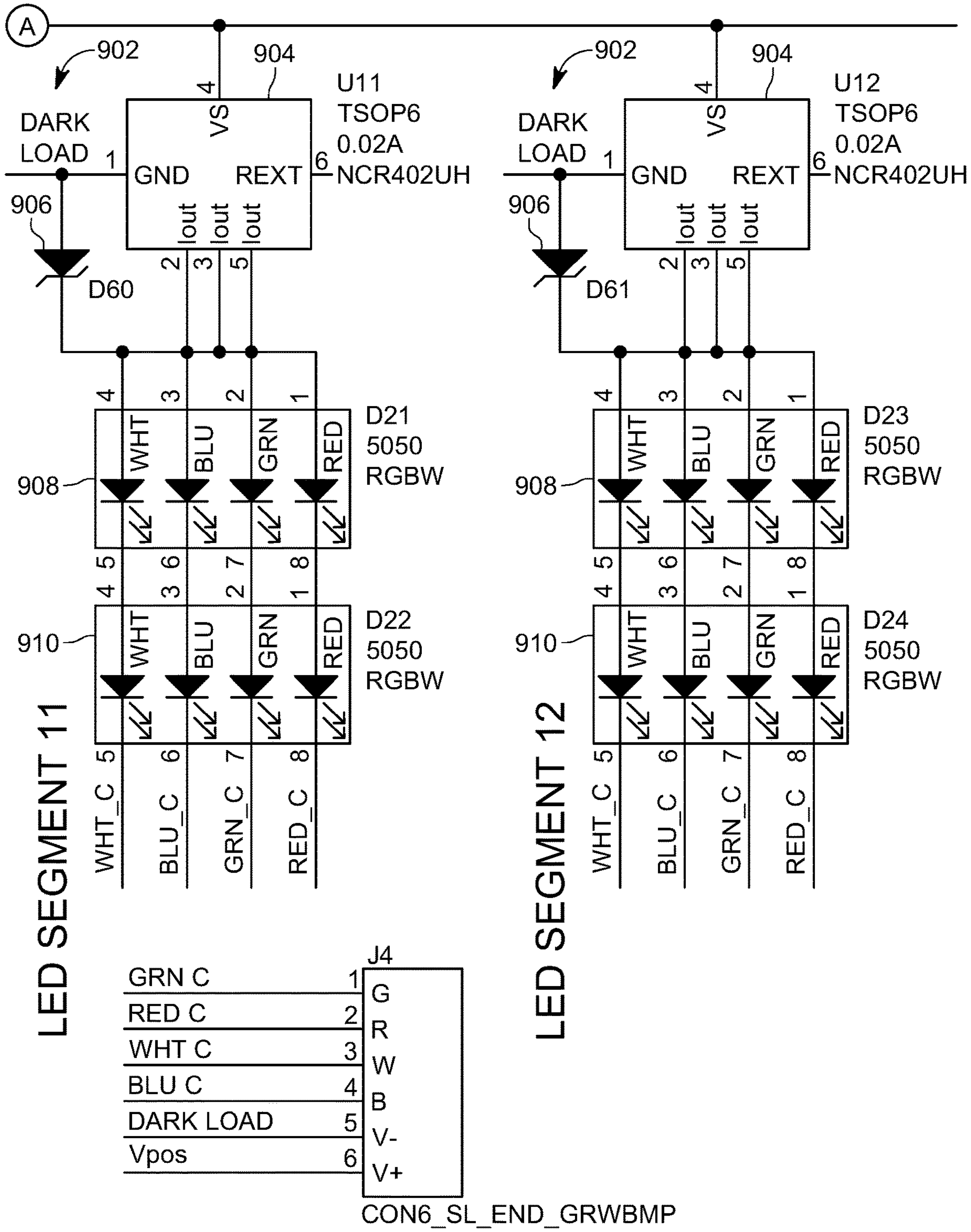

As was noted earlier herein, a light portion is connected to the controller via block 508, illustrated in FIGS. 6A-6C. Referring briefly to the lighting fixture 104 illustrated in FIG. 2 and the circuit board 306 illustrated in FIG. 3, the format of the illustrated exemplary lighting fixture 104 is a strip that is considerably longer than it its wide. In order to provide lighting evenly along such a structure, a series of lighting circuit portions are located along the length of such a strip. FIGS. 9A-9B show a schematic view 900 of four such lighting circuit portions 902. Each circuit portion 902 comprises a LED driver circuit 904, a non-illuminated load 906, and two sets of LEDs 908 and 910. Other embodiments may utilize one, or three or more such LED sets. Depending upon the brightness levels and configuration of the lighting fixture 104 desired. In an exemplary embodiment, the cathode portions of the LED set 910 is connected to a corresponding switch 602-608 (see FIGS. 6A-6C).

Figure 10:
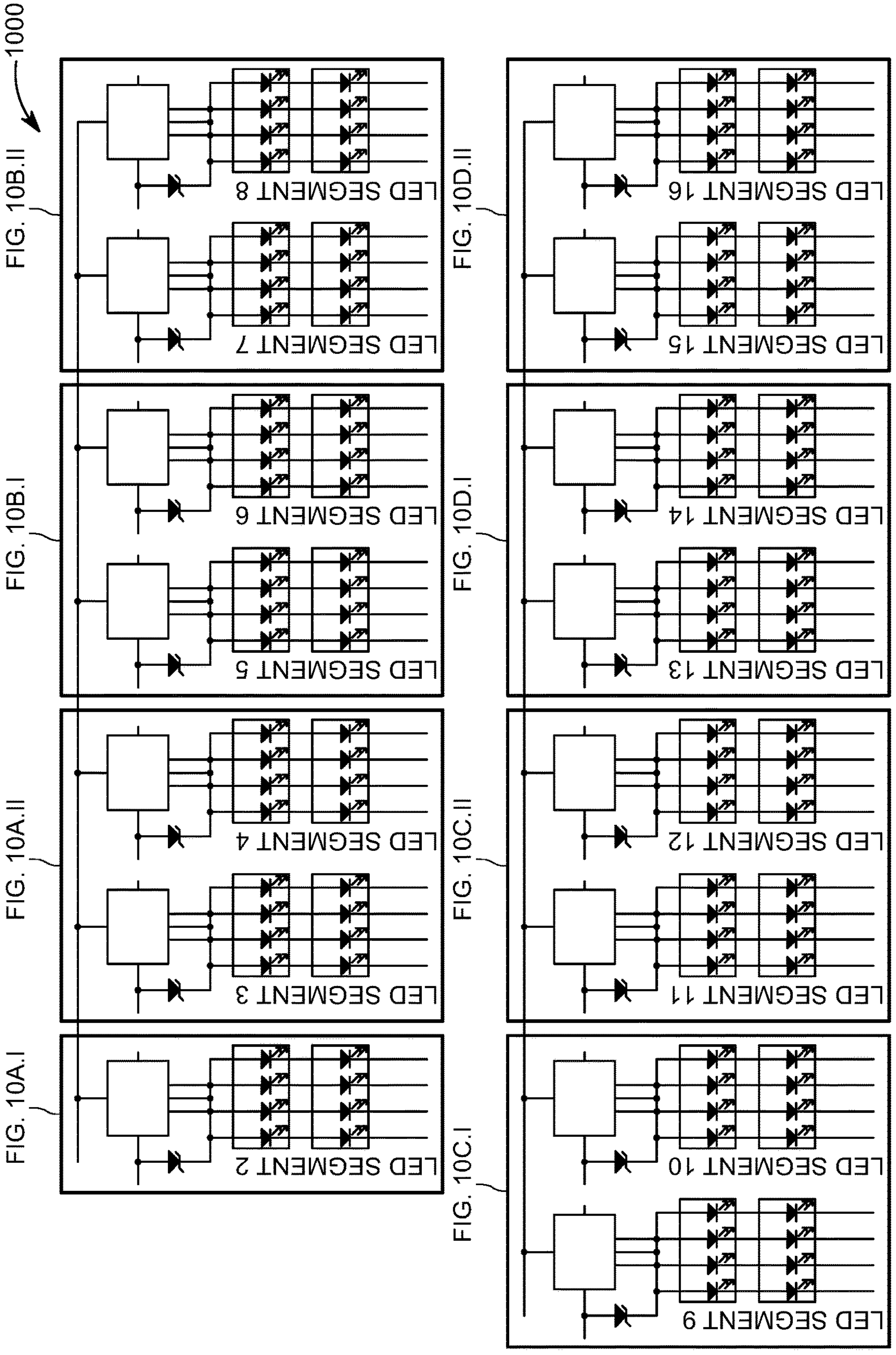
FIG. 10 (divided into FIGS. 10A.I-10D.II for clarity) illustrates a series of LED segments that are arranged without a controller according to an exemplary embodiment.

FIG. 10 (divided into FIGS. 10A.I-10D.II for clarity) shows an exemplary embodiment 1100 for use with FIGS. 5A-9B with fifteen LED subsystems, each called an "LED Segment" in FIG. 10. Each exemplary LED subsystem consists of an LED driver (NCR402UH), two RGBW LED packages (5050 SMD RGBW LED) connected in series (R, G, B, and W connections in series), and a Zener diode, which acts as the dark load in this embodiment. Segment 1 is missing and was replaced with the daughter board and other circuitry of FIGS. 5A-5E. Segment 2 consists of driver U2, Zener diode D51, and RGBW LED chips D3 and D4; Segment 3 consists of driver U3, Zener diode D52, and RGBW LED chips D5 and D6; Segment 4 consists of driver U4, Zener diode D53, and RGBW LED chips D7 and D8; Segment 5 consists of driver U5, Zener diode D54, and RGBW LED chips D9 and D10; Segment 6 consists of driver U6, Zener diode D55, and RGBW LED chips D11 and D12; Segment 7 consists of driver U7, Zener diode D56, and RGBW LED chips D13 and D14; Segment 8 consists of driver U8, Zener diode D57, and RGBW LED chips D15 and D16; Segment 9 consists of driver U9, Zener diode D58, and RGBW LED chips D17 and D18; Segment 10 consists of driver U10, Zener diode D59, and RGBW LED chips D19 and D20; Segment 11 consists of driver U11, Zener diode D60, and RGBW LED chips D21 and D22; Segment 12 consists of driver U12, Zener diode D61, and RGBW LED chips D23 and D24; Segment 13 consists of driver U13, Zener diode D62, and RGBW LED chips D25 and D26; Segment 14 consists of driver U14, Zener diode D63, and RGBW LED chips D27 and D28; Segment 15 consists of driver U15, Zener diode D64, and RGBW LED chips D29 and D30; and Segment 16 consists of driver U16, Zener diode D65, and RGBW LED chips D31 and D32. The outputs of each respective LED driver are connected to the anodes of the RGBW LEDs of the odd-numbered RGBW LEDs. The Zener diode is connected between that node (LED driver output and RGBW LED anodes) and a node formed by the common dark load control line and a respective GND pin of the LED driver. The VS pin of the driver is connected to a power line. The cathodes of the even-numbered RGBW LEDs are connected to the common RGBW control lines (switched to ground to turn ON). One end of this embodiment has two power connections to a power supply (FIGS. 3, 5A-5E, 11A.I-11A.II) and the other end has six (6) electrical conductors (FIGS. 11B.I-11B.II): the common RGBW control lines, the power line, and the common dark load control line. Thus, this embodiment accepts commands and power from one adjacent strip and optionally transmits commands and power to another optional adjacent strip. Looking at the corresponding PCB (FIGS. 11A.I-11B.II), the LED drivers, RGBW LED packages, and Zener diodes are distributed evenly along the length of the linear strip, e.g., Zener diode, RGBW LED package, driver, RGBW LED package, Zener diode, RGBW LED package, driver, RGBW LED package, Zener diode, RGBW LED package, driver, RGBW LED package, etc.

In exemplary installations in vehicles, power supply line 108, 206, 402 may be in close proximity to various other electronic circuitry including communications, navigation, various controls, and entertainment devices such as audio cables for speakers for playing music or other entertainment. These circuits may be vulnerable to noise (e.g., noise in the audio frequency range, e.g., 300-3000 Hz) or interference introduced by the switching on and off of control signals sent to luminaires via power supply lines 108, 206, 402. Thus, to reduce the likelihood of this noise or interference, the circuitry 400 of the lighting fixture 104 is adapted to maintain a constant load on the power source 106/controller 102 from the lighting fixture 104. This lowers the conducted and radiated noise from both the lighting fixture 104 and also the supply lines 108, 206, 402 that may be located near circuits vulnerable to noise. In an exemplary embodiment a single linear LED driver 904 (see FIGS. 9A-9B) is connected to the top of every LED string. As illustrated in FIGS. 9A-9B, a string consists of 2 LEDs in series and contains 4 channels (RGBW) (908 and 910). The number of regulators employed this depends on the length of the lighting fixture 104 as described earlier herein. The Cathodes of each color LED, red for example, are connected together and brought to a MOSFET (602-608). These MOSFETs (602-608) determine whether the LED corresponding to a particular color is on or off. With this type of configuration, the total current a string of two LEDs can have is 20 mA in a particular exemplary embodiment, regardless if one LED string or four LED strings is conducting at any given time. In an exemplary embodiment, the 20 mA current limitation is able to be adjusted based on LED and linear regulator limitations. In exemplary embodiments, the forward voltages of each LED color are different. As a result, two or more LED strings cannot be turned on simultaneously with the expectation that the current will be evenly distributed between those strings. For example, a blue LEDs may have a forward voltage (Vf) of 6V while the red LEDs have a forward voltage of 4V. Thus, if both LED channels are caused to conduct current, most of the available 20 mA of current will go through the red LED, while the blue LED may not even draw enough current to produce light. A linear regulator can be used to maintain a constant current through all LEDs. For example, when creating the color purple, the red and blue emitters are quickly switched back and forth at a rate that is fast enough such that it is difficult for the eye to detect that the switching is occurring. The blue LED is turned on by itself for part of the time with switch 604, then the red LED is turned on for another part of the time by switch 608. In an exemplary embodiment, this switching occurs several hundred times per second. The voltage ripple that would normally occur when turning off switch 604 prior to turning on switch 608 is substantially reduced by turning on switch 608 before turning off switch 604 during the process of mixing red and blue to create the color purple because at no point are either of the LEDs in the off state. Testing of exemplary embodiments has shown a drop in voltage ripple from over 12V down to just a few hundred mV with this method of mixing colors.

The color mixing method described in the previous paragraph performs well when the LEDs are driven at full power, however it does not work when the LED light intensity is lowered because there will need to be a period of time that the LED is turned off to reduce the intensity of the light produced by the LED. Pulse Width Modulation (PWM) dimming is a typical method employed to lower the intensity of an LED where the LED alternates between full on and full off at a high enough rate so that the flicker is not obvious to the user. In an ordinary implementation, this may result in a voltage ripple greater than 12 V on a 12 V nominal supply. One way to mitigate this high voltage ripple is to employ a large amount of Ceramic and Electrolytic capacitance. Due to the size limitation of linear lighting fixtures 104 as illustrated in FIG. 2, especially sealed linear fixtures, the required capacitance would be unlikely to fit within the confined space of the strip light and the extruded molding surrounding linear lighting fixtures 104. A reduced ripple voltage is instead achieved by adding a distributed load that intentionally dissipates power over the length of the linear luminaire while simultaneously not transmitting visible light. This is referred to herein as a "dark load". The total dissipated power of this load approximately equals the total power dissipated by the LEDs such that if a LED is switched off at some frequency to lower the intensity of the light produced by the LED, then the non-light transmitting load (dark load) will be used during the LED off times to maintain a nearly constant power draw by the linear light fixture 104. It is acknowledged that a dark load implementation is not an energy efficient solution because typical PWM controlled lighting will reduce power consumption proportional to the duty cycle of the light however in exemplary embodiments that implement dark loads, the constant power draw will reduce electrical interference.

In an exemplary embodiment, a dark load can be achieved by putting a zener diode across the output of the linear regulator and the ground return line used by the linear regulator. This ground return line is then connected to the fifth MOSFET which is illustrated in FIGS. 6A-6C as 610. FET 610 (U5) is the dark FET. In exemplary embodiments, dark FET 610 is switched ON and left ON while colors are being displayed by the luminaire(s), even if the LEDs are being switched ON and OFF for color rendering. The Zener diode is illustrated as 906 in FIGS. 9A-9B. When the LED light output is dimmed to half brightness, the 20 mA of current supplied to the LEDs would spend approximately 50% of the time going through an LED while the other 50% of the time the power would be dissipated through the Zener diode. In some exemplary embodiments the breakdown voltage of the Zener diode is selected to be about 7.5V or exactly 7.5V. The result is the Zener diode conducting automatically when all the LED MOSFETs (602-608) are turned off and thus not conducting. This automatic action of the Zener diode results because the LED forward voltage is lower than the selected Zener voltage. Thus, this fifth switch 610 allows the dark load and all the LEDs to be turned completely off if a PLI command is sent to the lighting fixture 104 to turn off or be set to 0% brightness.

Figure 12:
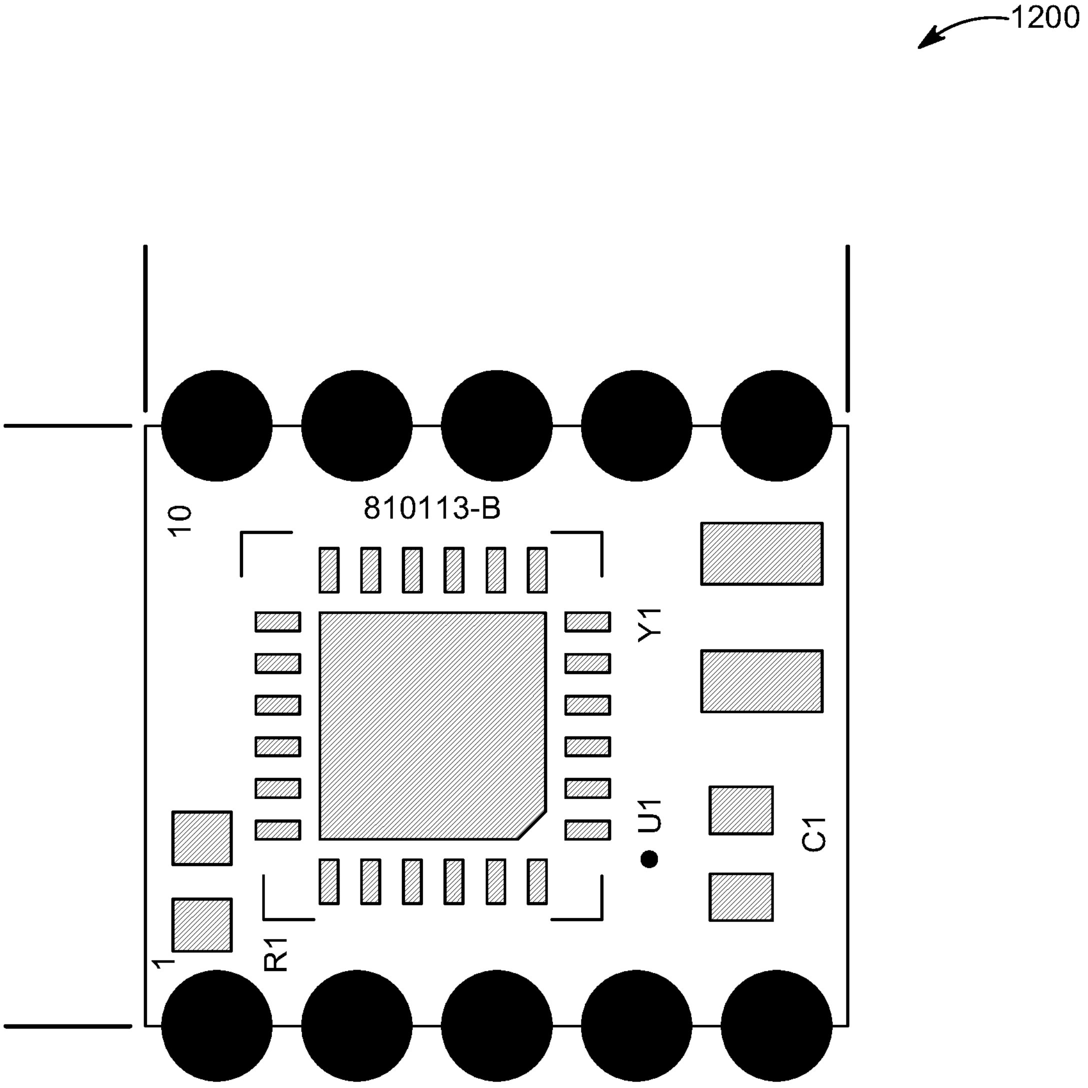
FIG. 12 illustrates an exemplary embodiment of the daughter board circuit board according to an exemplary embodiment.

The left portion 1100 and the right portion 1102 of a circuit board of an exemplary lighting fixture 104 is illustrated in FIGS. 11A.I-11A.II and 11B.I-11B.II while FIG. 12 illustrates the circuit board 1200 for an exemplary embodiment of the daughter board.

Figure 13:
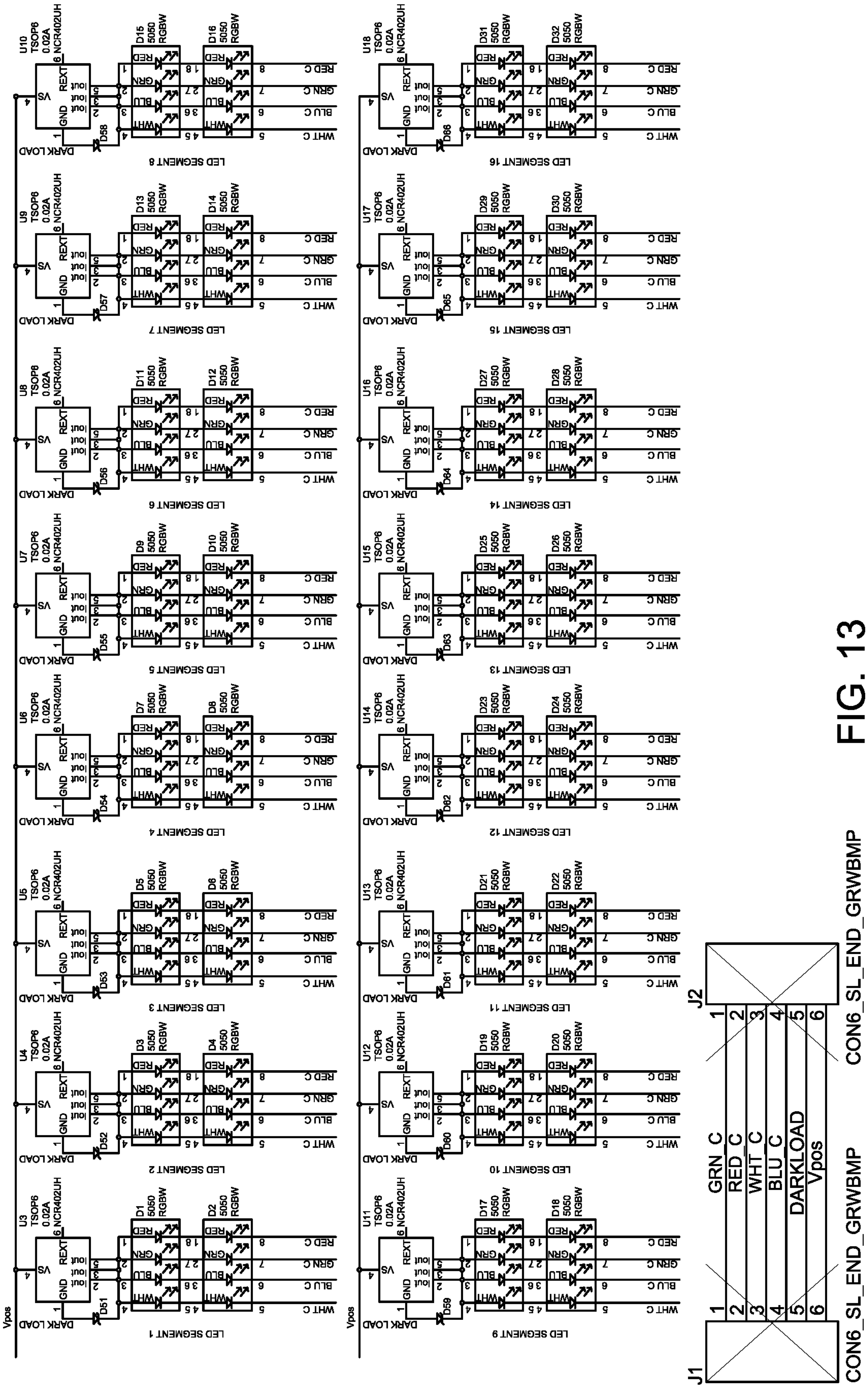
FIGS. 13-14 (divided into FIGS. 13A-13D and FIGS. 14A-14D for clarity) show an exemplary embodiment of another linear strip.
Figure 13A:
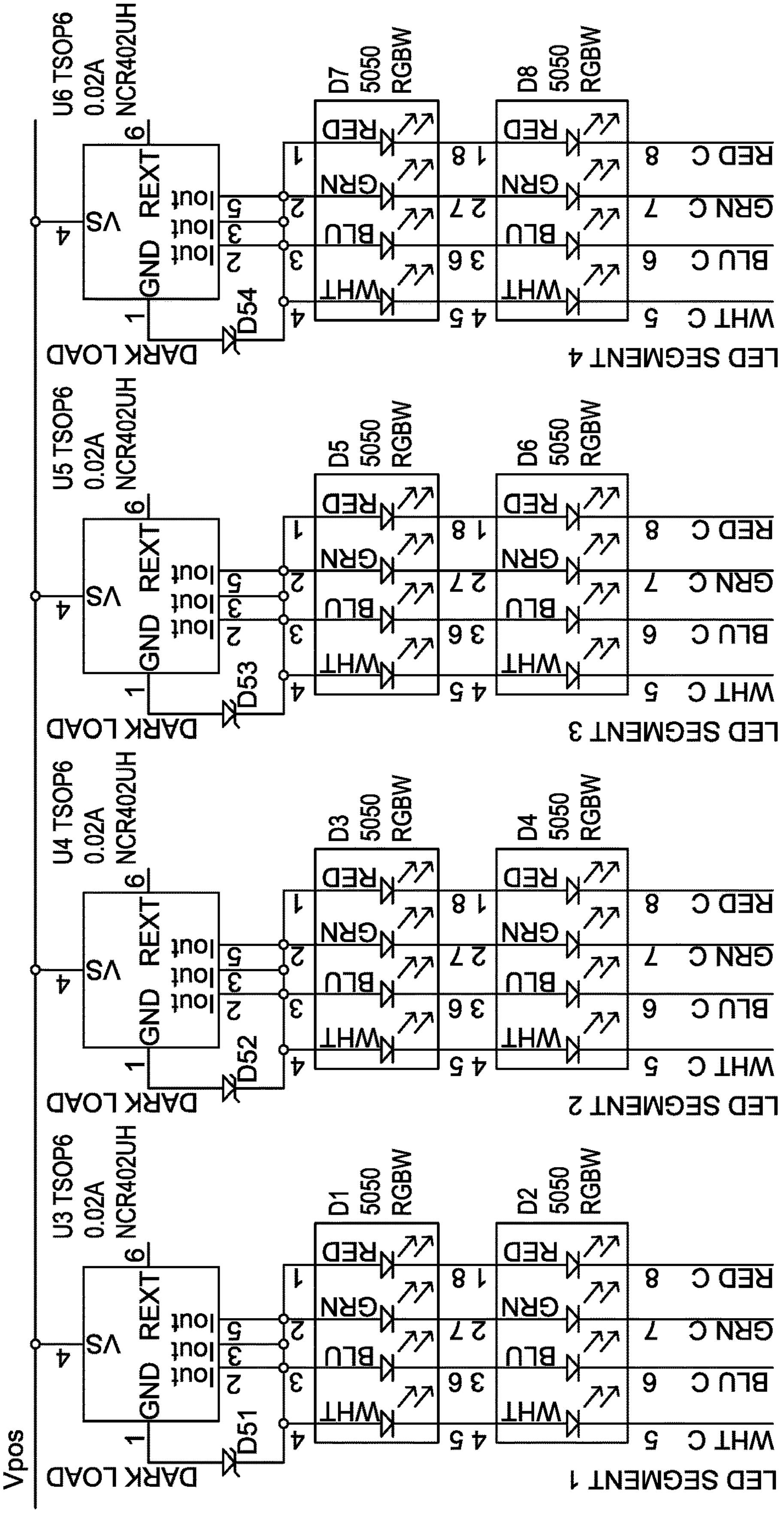
Figure 13B:
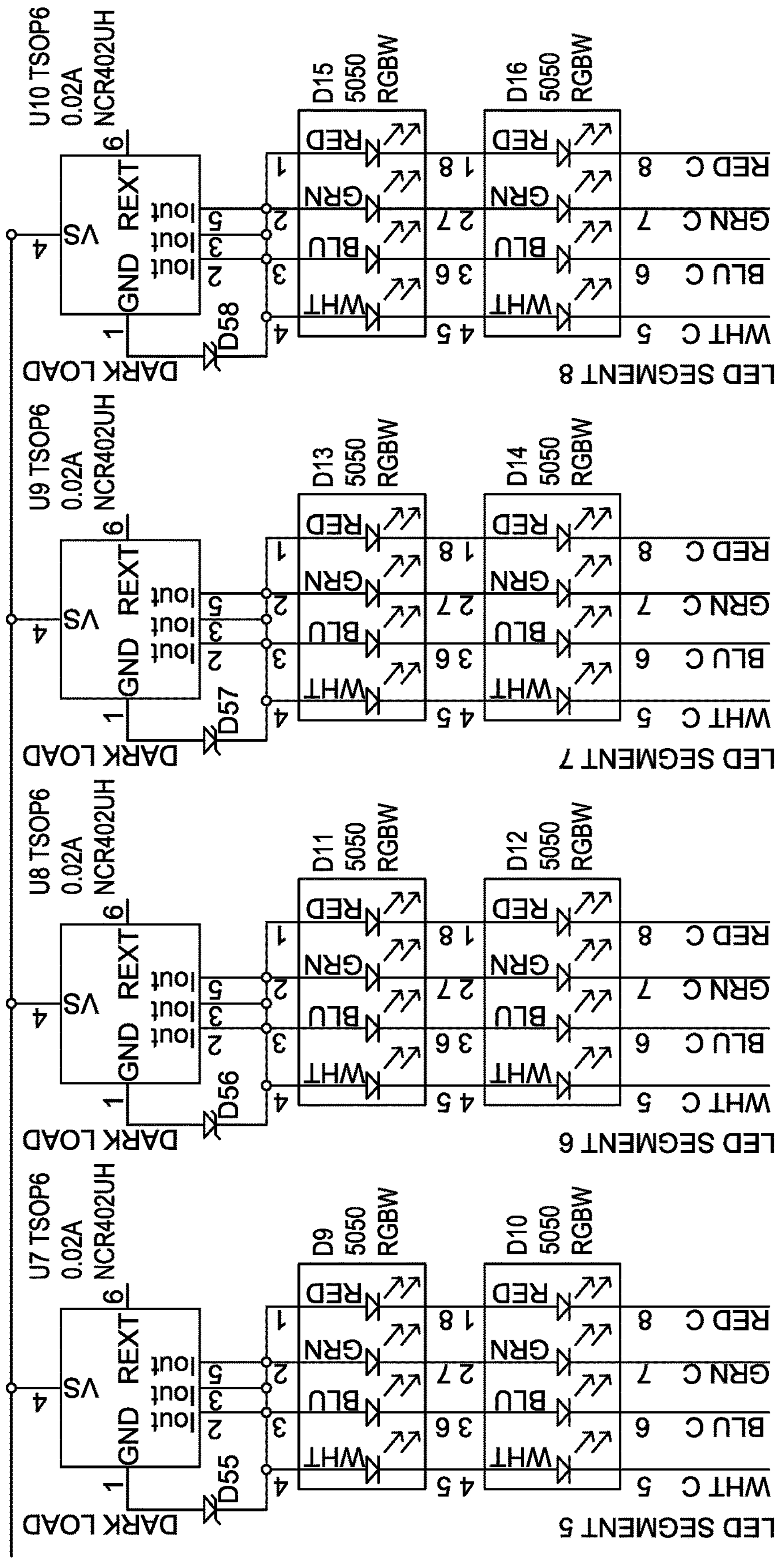
Figure 13C:
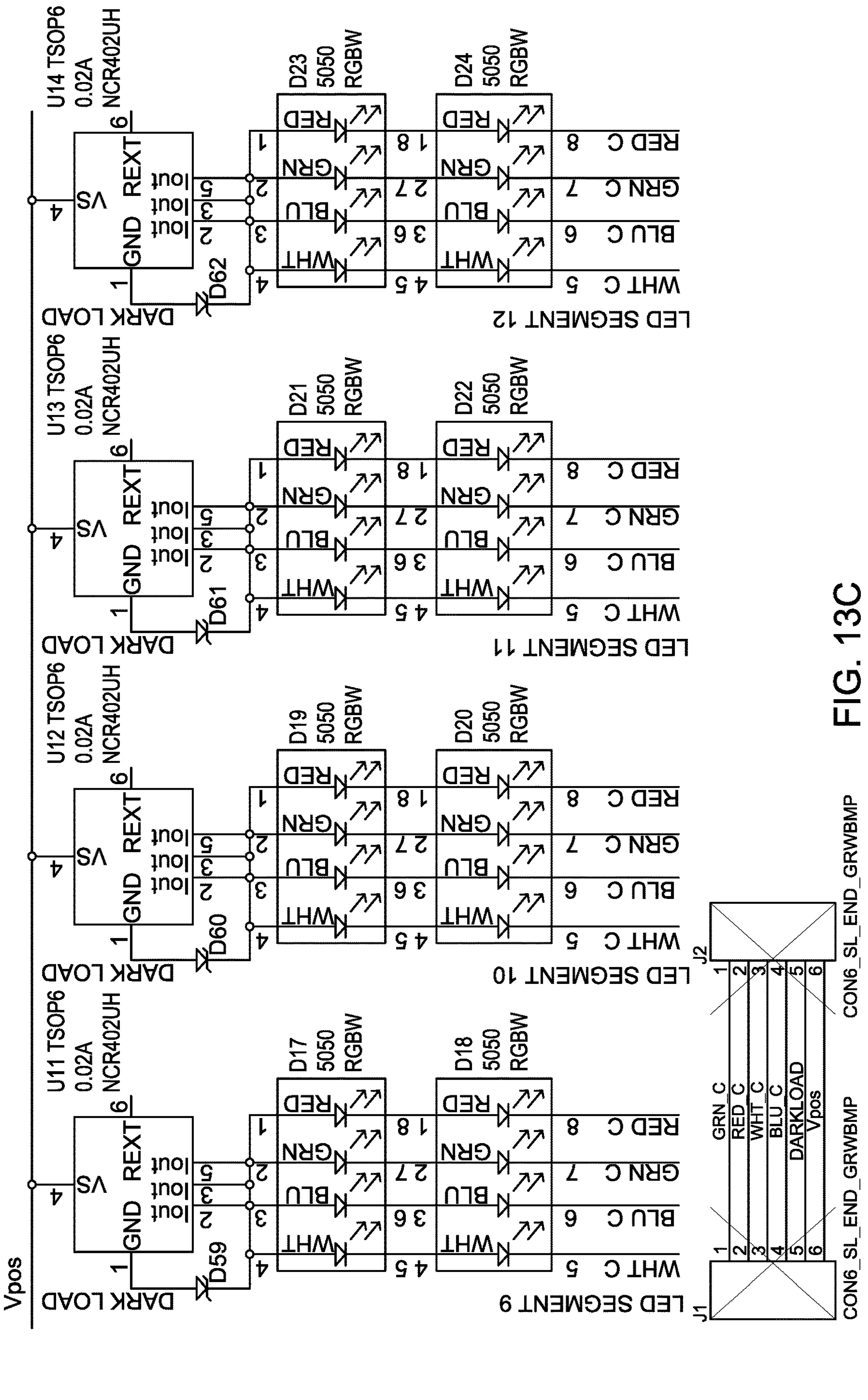
Figure 13D:
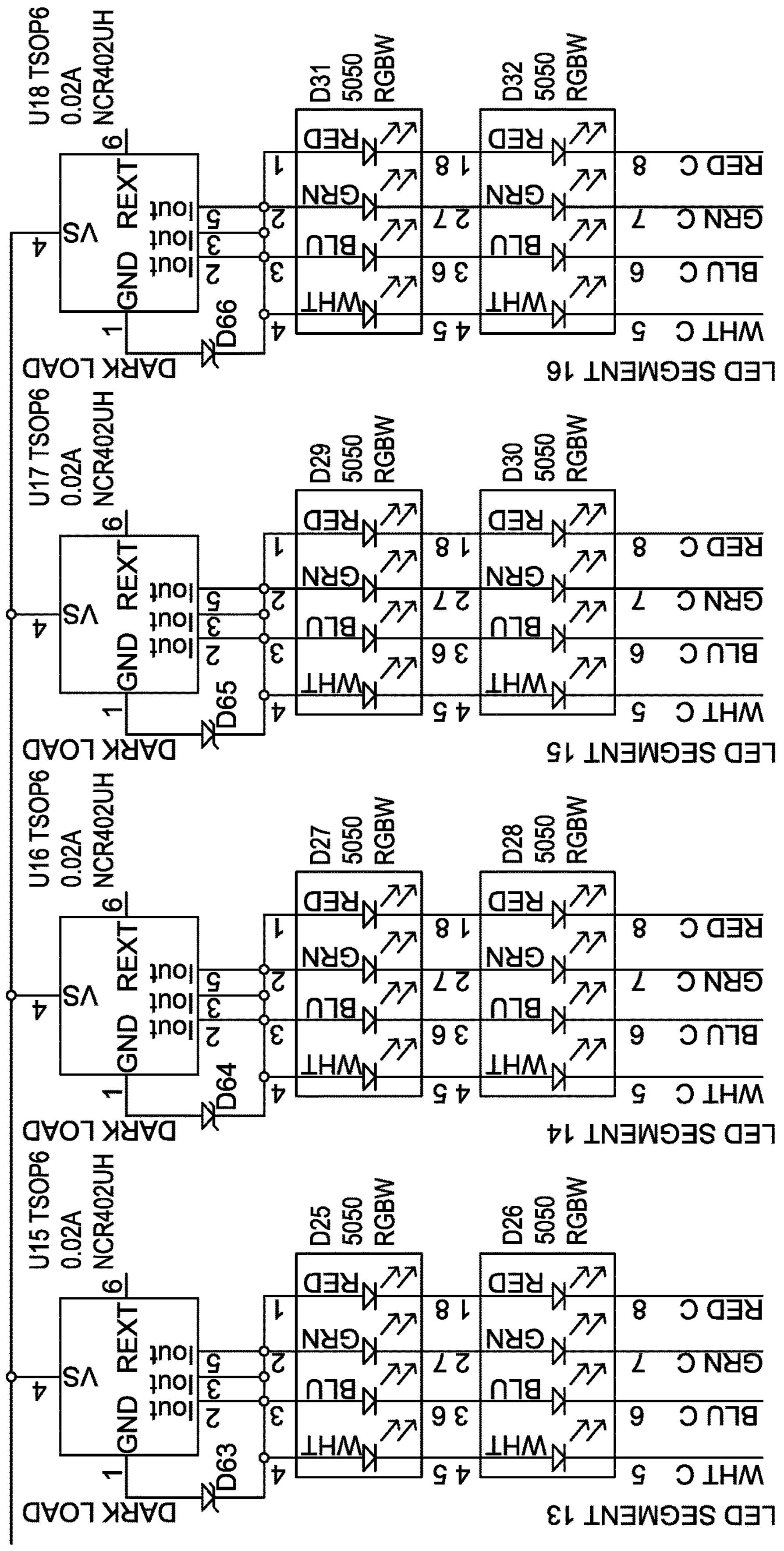
Figure 14A:
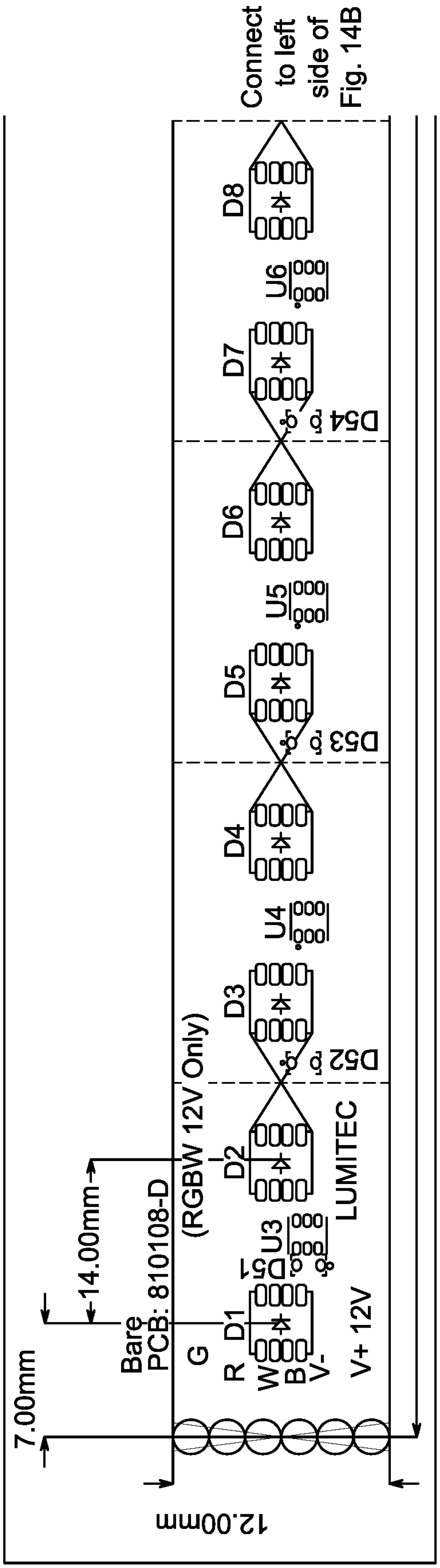
Figure 14B:
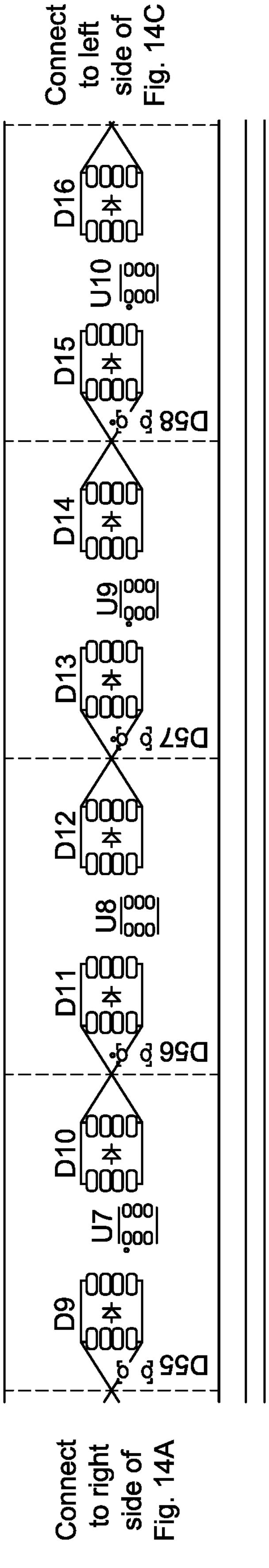
Figure 14C:
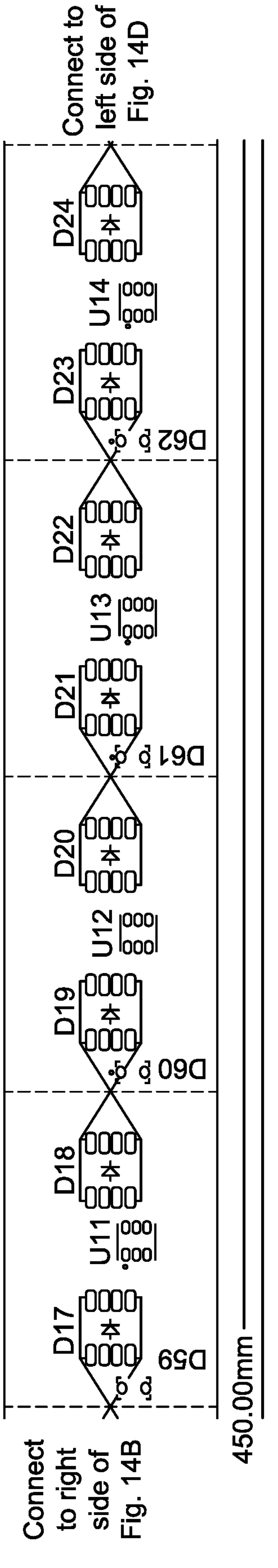
Figure 14D:
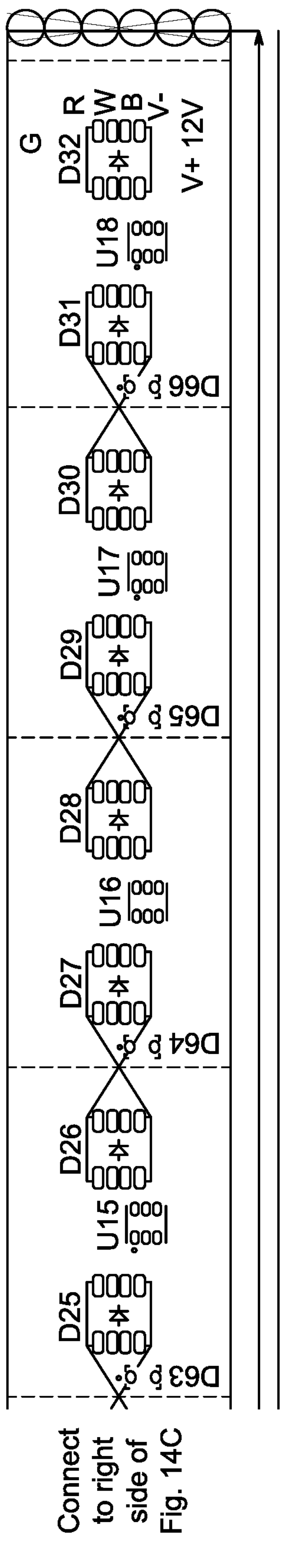
Figure 14:
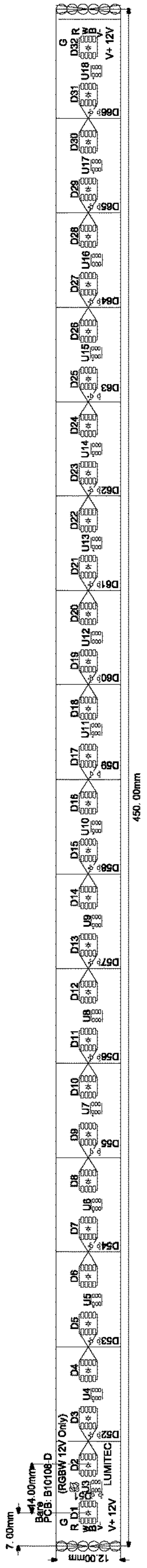

FIG. 13 (divided into FIGS. 13A-13D for clarity) shows an exemplary embodiment with sixteen LED subsystems, each called an "LED Segment" in FIG. 13, without an on-board controller (other than the controllers inherently in the LED drivers). This exemplary embodiment would be controlled by a different local strip, e.g., adjacent to this strip. Each exemplary LED subsystem consists of an LED driver (NCR402UH), two RGBW LED packages (5050 SMD RGBW LED) connected in series (R, G, B, and W connections in series), and a Zener diode, which acts as the dark load in this embodiment. Segment 1 consists of driver U3, Zener diode D51, and RGBW LED chips D1 and D2; Segment 2 consists of driver U4, Zener diode D52, and RGBW LED chips D3 and D4; Segment 3 consists of driver U5, Zener diode D53, and RGBW LED chips D5 and D6; Segment 4 consists of driver U6, Zener diode D54, and RGBW LED chips D7 and D8; Segment 5 consists of driver U7, Zener diode D55, and RGBW LED chips D9 and D10; Segment 6 consists of driver U8, Zener diode D56, and RGBW LED chips D11 and D12; Segment 7 consists of driver U9, Zener diode D57, and RGBW LED chips D13 and D14; Segment 8 consists of driver U10, Zener diode D58, and RGBW LED chips D15 and D16; Segment 9 consists of driver U11, Zener diode D59, and RGBW LED chips D17 and D18; Segment 10 consists of driver U12, Zener diode D60, and RGBW LED chips D19 and D20; Segment 11 consists of driver U13, Zener diode D61, and RGBW LED chips D21 and D22; Segment 12 consists of driver U14, Zener diode D62, and RGBW LED chips D23 and D24; Segment 13 consists of driver U15, Zener diode D63, and RGBW LED chips D25 and D26; Segment 14 consists of driver U16, Zener diode D64, and RGBW LED chips D27 and D28; Segment 15 consists of driver U17, Zener diode D65, and RGBW LED chips D29 and D30; and Segment 16 consists of driver U18, Zener diode D66, and RGBW LED chips D31 and D32. The outputs of each respective LED driver are connected to the anodes of the RGBW LEDs of the odd-numbered RGBW LEDs. The Zener diode is connected between that node (LED driver output and RGBW LED anodes) and a node formed by the common dark load control line and a respective GND pin of the LED driver. The VS pin of the driver is connected to a power line. The cathodes of the even-numbered RGBW LEDs are connected to the common RGBW control lines (switched to ground to turn ON). Both ends of this embodiment have six (6) electrical conductors: the common RGBW control lines, the power line, and the common dark load control line. Thus, this embodiment accepts commands and power from one adjacent strip and optionally transmits commands and power to another optional adjacent strip. Looking at the corresponding PCB in FIG. 14 (divided into FIGS. 14A-14D for clarity), the LED drivers, RGBW LED packages, and Zener diodes are distributed evenly along the length of the linear strip, e.g., Zener diode, RGBW LED package, driver, RGBW LED package, Zener diode, RGBW LED package, driver, RGBW LED package, Zener diode, RGBW LED package, driver, RGBW LED package, etc.

In exemplary embodiments, the LEDs in the luminaire are driven with a Pulse Width Modulated (PWM) signal. As used herein a "PWM signal" means a signal having voltage and/or current pulses that go to zero at some duty cycle, which duty cycle controls the illumination intensity of the LEDs. In exemplary embodiments, the non-illuminating load (dark load) components inside the luminaire are also driven with a PWM signal, such as a PWM signal opposite the PWM signal driving the LEDs. In some exemplary embodiments, the PWM signals have squared pulses. In other exemplary embodiments, the PWM signals have non-squared pulses, e.g., pulses that resemble a saw tooth signal in part, such as with a circuit with slew built into the components. LED drivers are typically either analog drivers (varied current and/or voltage) or PWM drivers. In some exemplary embodiments, the luminaire is controlled with Time Toggle protocol (TTP) commands or Power Line Instruction (PLI) commands and the LEDS and dark load are controlled with PWM signals, such as opposite PWM signals. In other exemplary embodiments, the luminaire is controlled with an analog control signal and the LEDS and dark load are controlled with PWM signals, such as opposite PWM signals. In still other exemplary embodiments, the luminaire controller is configured to can accept a PWM signal as dimming input for the luminaire from a 3rd party controller.

In exemplary embodiments, the LED driver current is either fully on or off at any instant, and dimming and color-mixing (e.g., as set by TTP, PLI, or some other control scheme or communication protocol) are achieved by reducing the fraction of ON-time, thereby reducing the average current over a longer period of time than the pulses (~10 ms). In these embodiments, the timing of each RGBW component LED and corresponding "dark-load" (non-illuminating load) are scheduled such that only one and exactly one is turned on at every instant. In some exemplary embodiments, each RGBW component LED and has a corresponding "dark-load" (non-illuminating load). In other exemplary embodiments, one or more centralized "dark-loads" (non-illuminating loads) are used to balance whatever RGBW component LEDs are ON/OFF at any given moment to maintain the same power draw. The preprogrammed firmware of the processor in the controller calculates each components ON-time for each mixing period. In exemplary embodiments, the controller achieves low flicker, high resolution dimming and color-mixing, and low noise on the power line, as discussed herein. This achieves very low input voltage/current ripple for the luminaire (hence low EMI), such as 300 mV, or 200 mV , or 100 mV, or 50 mV or less ripple on the power line powering the luminaire, since there is always the same load current (except for 3rd-party PWM mode, mentioned above).

What have been described above are examples. It is, of course, not possible to describe every conceivable combination of components for purposes of describing the examples of the disclosure described herein, but one of ordinary skill in the art will recognize that many further combinations and permutations of the examples are possible. Accordingly, the examples described herein are intended to embrace all such alterations, modifications and variations that fall within the scope of the appended claims and the application. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, the term "including" means including but not limited to. The term "based on" means based at least in part on. Moreover, although various aspects of the claimed subject matter have been described herein, such aspects need not be utilized in combination. It is therefore intended that the appended claims caver all such changes and modifications that are within the scope of the claimed subject matter.

What is claimed is:

1. A flexible linear strip LED luminaire comprising:
LEDs; and
a distributed, non-illuminating load intentionally used to dissipate power over the length of the linear strip LED luminaire,
wherein the non-illuminating load does not transmit visible light, and
wherein a total dissipated power of the non-illuminating load approximately equals a total power dissipated by the LEDs such that if the LEDs are switched on and off at some frequency to lower the intensity of the light then the non-illuminating load is used to maintain a nearly constant power when the LEDs are switched off.

2. The LED luminaire according to claim 1, wherein the LED luminaire comprises at least two modes:
(a) a full brightness state in which the LEDs are outputting maximum light output and the LED luminaire draws an amount of power; and
(b) a dimmed state in which the LEDs are illuminated but are outputting less light output than the full brightness state and the LED luminaire draws about the same amount of power as in the full brightness state.

3. The LED luminaire according to claim 2, wherein the LED luminaire further comprises a mode in which the LEDs are dimmed to about 10% of the light output of the full brightness state and the LED luminaire draws about the same amount of power as in the full brightness state.

4. The LED luminaire according to claim 3, wherein the LED luminaire further comprises an off mode in which the LEDs do not illuminate and LED drivers that drive the LEDs in the full brightness state and dimmed state draw substantially zero power.

5. The LED luminaire according to claim 1, comprising:
a flexible substrate at least 25 times as long as the flexible substrate is wide, having a first end and a second end, having a first plurality of electrical conductors at the first end for communications from a first adjacent flexible LED luminaire, and having a second plurality of electrical conductors at the second end for communications to a second adjacent flexible LED luminaire;
wherein the first plurality of electrical conductors at the first end comprises:
a first LED power line;
a plurality of color ground lines, each color ground line for controlling one or more LEDs that generate one or more colors different from the other color ground lines; and
a dark load control line for controlling the non-illuminating load to help balance power consumption by the first adjacent flexible LED luminaire; and
wherein the second plurality of electrical conductors at the second end comprises:
a second LED power line;
a plurality of color ground lines, each color ground line for controlling one or more LEDs that generate one or more colors different from the other color ground lines; and
a dark load control line for controlling a the non-illuminating load to help balance power consumption by the second adjacent flexible LED luminaire.

6. The LED luminaire according to claim 5, further comprising a dark load control line for controlling the non-illuminating load to help balance power consumption by the LED luminaire.

7. The LED luminaire according to claim 5, further comprising circuitry generating a dark load control line for controlling the non-illuminating load to help balance power consumption by the LED luminaire.

8. The LED luminaire according to claim 5, further comprising circuitry that accepts as an input a dark load control line for controlling the non-illuminating load to help balance power consumption by the LED luminaire.

9. The LED luminaire according to claim 5, wherein the LED luminaire comprises less than 150 mV ripple on at least one of the first or second power line while displaying a color at maximum illumination requiring significant switching of LEDs.

10. The LED luminaire according to claim 5, wherein the LED luminaire comprises less than 100 mV ripple on at least one of the first or second power line while displaying a color at maximum illumination requiring significant switching of LEDs.

11. The LED luminaire according to claim 5, wherein the LED luminaire comprises an LED driver switching frequency of 240-24,000 Hz for creation of colors using light combined from different LEDs.

12. The LED luminaire according to claim 5, wherein the LED luminaire comprises less than 300 mV ripple on at least one of the first or second power line while displaying a color at less than 50% of maximum illumination.

13. The LED luminaire according to claim 5, wherein the LED luminaire comprises less than 150 mV ripple on at least one of the first or second power line while displaying a color at less than 50% of maximum illumination.

14. The LED luminaire according to claim 5, wherein the LED luminaire comprises less than 100 mV ripple on at least one of the first or second power line while displaying a color at less than 50% of maximum illumination.

15. The LED luminaire according to claim 5, wherein the LEDs are driven with a PWM signal.

16. The LED luminaire according to claim 15, wherein the non-illuminating load components are driven with a PWM signal.

17. The LED luminaire according to claim 15, wherein the non-illuminating load is driven with a PWM signal that is the opposite of the PWM signal driving the LEDs.

18. The LED luminaire according to claim 2, wherein the LED luminaire further comprises an off mode in which the LEDs do not illuminate and LED drivers that drive the LEDs in the full brightness state and dimmed state draw substantially zero power.

19. The LED luminaire according to claim 1, further comprising a switch to turn off the non-illuminating load when the LED luminaire is turned off or set to 0% brightness.

20. The LED luminaire according to claim 2, further comprising a switch to turn off the non-illuminating load when the LED luminaire is turned off or set to 0% brightness.

21. The LED luminaire according to claim 3, further comprising a switch to turn off the non-illuminating load when the LED luminaire is turned off or set to 0% brightness.

22. The LED luminaire according to claim 4, further comprising a switch to turn off the non-illuminating load when the LED luminaire is turned off or set to 0% brightness.

23. The LED luminaire according to claim 5, further comprising a switch to turn off the non-illuminating load when the LED luminaire is turned off or set to 0% brightness.

* * * * *